(12) United States Patent
Diehl et al.

(10) Patent No.: US 7,577,490 B2
(45) Date of Patent: Aug. 18, 2009

(54) ENGAGEMENT MILLING

(75) Inventors: Alan Diehl, Westlake Village, CA (US); Robert B. Patterson, Bellevue, WA (US)

(73) Assignee: Surfware, Inc., Camarillo, CA (US)

( * ) Notice: Subject to any disclaimer, the term of this patent is extended or adjusted under 35 U.S.C. 154(b) by 655 days.

(21) Appl. No.: 11/112,396

(22) Filed: Apr. 22, 2005

(65) Prior Publication Data
US 2005/0256604 A1 Nov. 17, 2005

Related U.S. Application Data

(63) Continuation-in-part of application No. 11/070,430, filed on Mar. 2, 2005, now Pat. No. 7,451,013.

(60) Provisional application No. 60/566,586, filed on Apr. 29, 2004.

(51) Int. Cl.
*G06F 19/00* (2006.01)

(52) U.S. Cl. .............. 700/173; 700/188; 700/190; 700/186; 700/187; 700/191

(58) Field of Classification Search .............. 700/186, 700/173, 190, 191, 192, 159
See application file for complete search history.

(56) References Cited

U.S. PATENT DOCUMENTS

| | | | |
|---|---|---|---|
| 4,907,164 A | 3/1990 | Guyder | |
| 5,444,636 A | 8/1995 | Yoshida | |
| 5,532,933 A | 7/1996 | Nakata | |
| 6,266,572 B1 | 7/2001 | Yamazaki | |
| 6,428,252 B1 * | 8/2002 | Oldani | 409/132 |
| 6,438,445 B1 | 8/2002 | Yoshida | |
| 6,447,223 B1 | 9/2002 | Farah et al. | |
| 6,535,788 B1 | 3/2003 | Yoshida | |
| 6,591,158 B1 | 7/2003 | Bieterman et al. | |
| 6,745,100 B1 | 6/2004 | Lermuzeaux | |
| 6,772,039 B2 | 8/2004 | Kakino | |
| 6,824,336 B2 | 11/2004 | Izutsu | |
| 6,942,436 B2 * | 9/2005 | Kakino et al. | 409/84 |
| 2001/0000805 A1 | 5/2001 | Kadono | |
| 2002/0055805 A1 | 5/2002 | Matsumoto | |
| 2003/0118416 A1 | 6/2003 | Murakami | |
| 2004/0019394 A1 | 1/2004 | Red | |

OTHER PUBLICATIONS

Choy, et al., "A corner-looping based tool path for pocket milling," *Computer-Aided Design*, 35 pp. 155-166 (2003).
Kramer, Thomas R., "Pocket Milling with Tool Engagement Detection," cover page and pp. 1-16 (Apr. 4, 1991).

(Continued)

*Primary Examiner*—Kidest Bahta
*Assistant Examiner*—Nathan Laughlin
(74) *Attorney, Agent, or Firm*—Panitch Schwarze Belisario & Nadel LLP

(57) ABSTRACT

A method for generating, by a direct process, a tool path for milling a region of a workpiece by a milling cutter is disclosed. The tool path consists of one or more passes. The method includes the steps of storing a maximum engagement of the milling cutter and defining each one of the one or more passes such that a value of the engagement, when traversing each one of the one or more passes, does not exceed the maximum value of engagement.

16 Claims, 20 Drawing Sheets

OTHER PUBLICATIONS

Stori, et al., "Constant Engagement Tool Path Generation for Convex Geometries," *J. Mfg. Systems*, 19:3; ABI/INFORM Global (2000).

Tsai, et al., "Operation Planning Based on Cutting Process Models," *Annals of the CIRP*, vol. 40, pp. 95-98 (Jan. 1991).

Wang, et al., "A Metric-Based Approach to 2D Tool-Path Optimization for High-Speed Machining," 9 pages. (Feb. 2005).

A. CD disk received from third party by Attorney of Record on Dec. 20, 2005, marked adaptive cleaning, with following files: 1. Adaptive_Cleaning_Demo_hq.wmv 2. Adaptive_HSM_A4.pdf 3. freesteel_best.avi 4. Desktop DB 5. Desktop DF The author and the dates of publication of the files are unkown.

B. Letter accompanying CD disk received from third part by Attorney of Record on Dec. 20, 2005.

C. Comments of Applicants received by Attorney of Record on Jan. 5, 2005.

Soichi Ibaraki et al.; Tool Path Planning Using Trochoid Cycles for Hardened Steel in Die and Mold Manufacturing (1st Report)—Tool Path Generation for Trochoid Cycles Based on Voronoi Diagram -; Advanced in Agile Manufacturing—ICAM 2003; 2003 China Machine Press, ISBN 7-111-13395-1; pp. 435-442.

Iwao Yamaji et al.; Tool Path Planning Using Trochoid Cycles for hardened Steel in Die and Mold Manufacturing (2nd Report)—Tool Path Planning to Avoid an Excessive Tool Load -; Advances in Agile Manufacturing—ICAM 2003; 2003 China Machine Press, ISBN 7-111-13395-1; pp. 443-450.

* cited by examiner

Straight Line

Convex Curve

Concave Curve

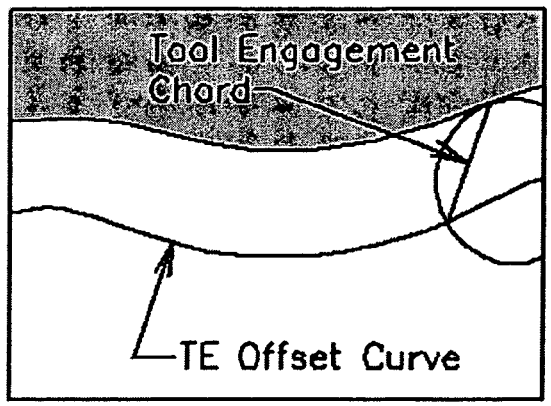
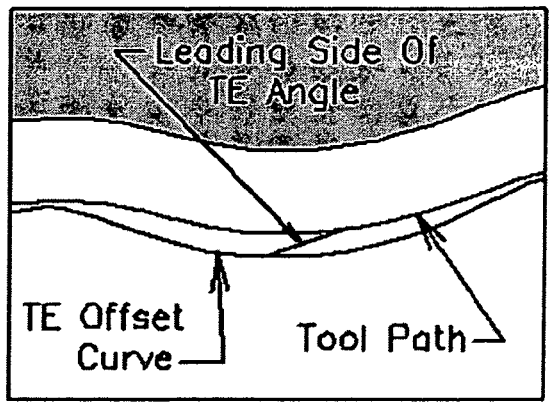
FIG. 18
FIG. 19
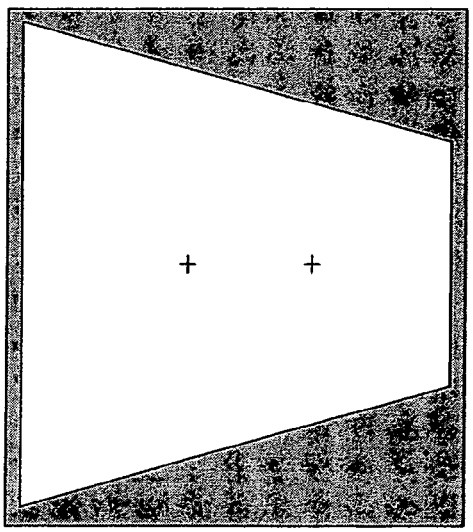
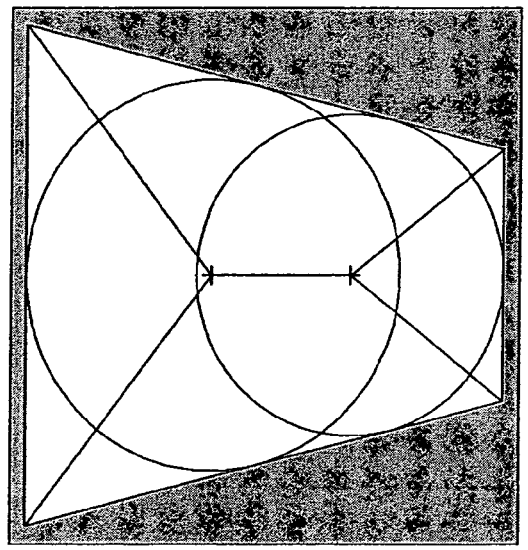
FIG. 20
FIG. 21

ENGAGEMENT MILLING

CROSS-REFERENCE TO RELATED APPLICATIONS

This application is a continuation-in-part of application Ser. No. 11/070,430 entitled "Engagement Milling", filed Mar. 2, 2005, which is hereby incorporated by reference in its entirety. This application claims the benefit of provisional application No. 60/566,586, entitled. "Engagement Milling", filed Apr. 29, 2004, which is hereby incorporated by reference in its entirety.

BACKGROUND OF THE INVENTION

Field of the Invention

This invention relates to computer aided manufacturing and more specifically to a method and apparatus for generating a computer numerical control program for controlling a numerical control machine.

In milling a workpiece using a numerical control (NC) machine, it is desirable to remove material from the workpiece as fast as possible consistent with long tool life. Controlling tool load throughout each tool path to be within a preferred range is of primary importance for achieving long tool life. Therefore, a computer aided manufacturing (CAM) system that creates a computer numerical control (CNC) program having tool paths which maintain the tool load within the preferred range throughout each tool path, while generating tool paths which cumulatively remove the greatest amount of material in the shortest possible time, is desirable for cost effective milling.

It is widely accepted that maintaining a constant engagement of the milling cutter over the tool path is a major factor in controlling tool load. However, existing machining strategies, such as the widely used direction parallel (zig or zig-zag) and contour machining strategies, and their variations, generate tool paths which are dictated by a part boundary, a material boundary or a combination of the part boundary and the material boundary, and not by considerations of maintaining the engagement of the milling cutter constant over the tool path. Such milling strategies force the milling cutter to execute sharp turns resulting in widely varying cutter engagement. Such variations in tool engagement cause spikes in tool load producing undesirable effects such as shorter tool life, chatter and even tool breakage.

In order to mitigate the effect of spikes in the tool load caused by a sudden increase or decrease in tool engagement, users of existing CAM programs typically reduce the feed rate for an entire tool path to be consistent with the peaks of the spike loads. Such reductions in feed rate can result in significant reductions in milling efficiency.

In order to resolve problems arising from existing machining strategies, methods have been proposed in which the machining conditions such as engagement angle and feed rate of a tool path are evaluated after the tool path is created. The tool path is then modified according to various criteria. Such modifications include adding additional segments to portions of the tool path or reducing the curvature of the tool path in those local portions of the tool path in which the tool engagement is excessive. However, by piecemeal correction of local machining conditions in the tool path, machining conditions in other portions of the tool path may be altered in unpredictable ways. Further, while the aforementioned types of tool path modifications avoid large spikes in the tool load, these types of modifications typically result in additional length to the total tool path and do little to maintain a relatively constant engagement of the milling cutter over the entirety of the tool path.

A further problem with existing CAM programs is reliance on simple measures (i.e. chip load) as a measure of the load on the milling cutter. Real tool load is a function of both undeformed chip thickness (UCT) and tool engagement. In order to maintain the tool load within a preferred range, the feed rate of the milling cutter should be based on both the UCT and the tool engagement.

In consideration of the above, it would be desirable for a CAM system to create, by a direct process, a CNC program which generates tool paths for milling a region of a workpiece which are based on controlling the tool engagement and for which the tool engagement is maintained to be substantially constant over a major portion of the tool path without exceeding a maximum value of the tool engagement. Further, it would be desirable for the CAM system to create, by a direct process, tool paths suitable for milling all types of convex and concave geometries. Further, it would be desirable for the CNC program to provide for controlling the feed rate of the tool such that the load on the tool is automatically maintained within a preferred range over the entirety of the tool path.

BRIEF SUMMARY OF THE INVENTION

Briefly stated, the present invention comprises a method for generating, by a direct process, a tool path consisting of one or more passes, for milling a region of a workpiece by a milling cutter. The method comprises the steps of storing a maximum engagement of the milling cutter and defining each one of the one or more passes such that a value of the engagement, when traversing each one of the one or more passes, does not exceed the maximum value of engagement.

In another aspect, the present invention comprises an article of manufacture including computer executable instructions stored on a computer readable medium which generate, by a direct process, a tool path consisting of one or more passes, for milling a region of a workpiece by a milling cutter. The instructions include the steps of storing a maximum engagement of the milling cutter and defining each one of the one or more passes such that a value of the engagement, when traversing each one of the one or more passes, does not exceed the maximum value of engagement.

The present invention creates, by a direct process, tool paths which are inherently free from the substantial variations in tool engagement which are characteristic of tool paths based on workpiece boundaries. The tool paths created by the present invention are based on controlling the engagement of the tool itself and are not compelled by the shape of the part to be machined. Further, a maximum engagement angle for each tool path may be specified by a user to be any value up to 180 degrees. In contrast to existing methods, which from the creation of the very first pass of the tool path, start transforming the shape of the workpiece into the shape of the part to be formed, the shape of the part to be formed by the present invention does not become apparent until the concluding portions of the tool path are executed. In the present invention, the first pass of the tool path is generated for the purpose of the enabling the second pass to be executed in a fashion such that a predetermined maximum tool engagement is not exceeded when the second pass is executed by the milling cutter. Similarly, the second pass is generated for the purpose of the enabling the third pass to be executed such that the predetermined maximum tool engagement is not exceeded.

This process is repeated until all of the material is removed from the part being machined. Advantageously, material is removed more quickly than by existing methods because the feed rate of the milling cutter can be maintained at near theoretical rates for the majority of the tool path.

The above and further features of the invention will be fully apparent from the detailed description and the accompanying drawings.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 18 illustrates an alternate method for constructing the in-process material boundary according to the fifth embodiment;

FIG. 19 illustrates another alternate method for constructing the in-process material boundary according to the fifth embodiment;

FIG. 20 illustrates the creation of a medial axis transform for a trapezoid according to a sixth embodiment;

FIG. 21 illustrates the creation of the outer circles of two circle families according to the sixth embodiment;

DETAILED DESCRIPTION OF THE INVENTION

Definitions

Figure 1:
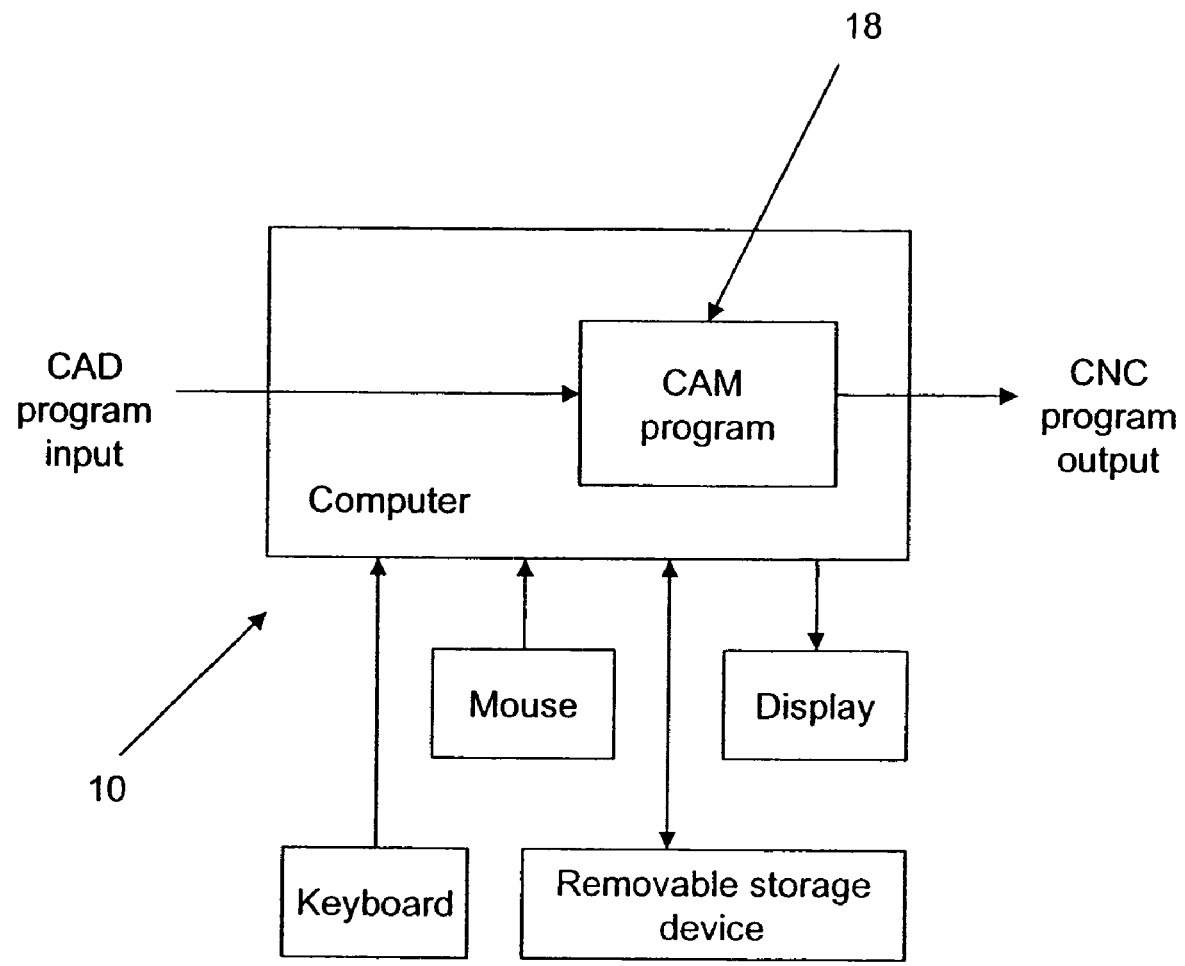
FIG. 1 is a functional block diagram of a computer aided manufacturing system according to the present invention.

The following definitions are to be applied to terminology used in the application:

Arc—a curved line—not necessarily circular.

Axial Depth of Cut—the depth of cut in the axial direction of a milling cutter.

CAM—computer aided manufacturing.

CAM program—a computer program used for generating a computer numerical control (CNC) program for milling a workpiece by a numerical control (NC) machine.

center-line feed rate—the feed rate measured at the rotational axis of the milling cutter.

Chip Load—the distance a tool moves as a single flute of the tool cuts material=feed rate/(spindle speed×number of flutes)

Circular arc—the set of all points equidistant from a fixed point called the center, i.e. a portion of a circle.

CNC program—the output of a CAM program consisting of a set of instructions, i.e. a program, defining machining conditions and movements of a tool mounted in a numerical control machine relative to a workpiece mounted in the numerical control machine.

Feed rate—the rate at which a milling cutter moves along a tool path, measured at the rotational axis of the milling cutter.

In-process material boundary—a boundary of the workpiece established by a cutting operation. The in-process material boundary is always offset from the tool path by the radius of the milling cutter.

Material boundary—a part boundary or in-process material boundary.

Milling cutter—a cutter which rotates about a rotational axis including, but not limited to, end mills, face mills, shell mills, slab mills, plunge mills, single angle cutters, dovetail cutters, keyseat cutters, T-slot cutters, concave and convex cutters and gear hob cutters.

Part boundary—the fixed boundary of the workpiece to be attained at the completion of the milling operation, generally defined by a blue print of the part or by a computer aided design (CAD) program.

Pass—a portion of the tool path for which the milling cutter is in continuous contact with the workpiece.

Peripheral (effective) feed rate—the rate at which a milling cutter moves along a tool path, measured at the periphery of the milling cutter.

Programmed feed rate—a reference value of the feed rate, typically selected by the NC programmer.

Radial depth of cut—the amount of material removed in the radial direction of the milling cutter.

Smooth curve—a curve in which the unit tangent to the curve is continuous at every point along the curve.

Spindle speed—the rotational speed of the tool.

Stepover (or stepover value)—the distance normal to a tool path between a first pass and a substantially parallel second pass.

Undeformed chip thickness—the maximum thickness of a chip removed by a single cut of a single flute of a milling cutter.

Tangent continuous—forming a smooth curve.

TEC—tool engagement curve—a tool path which causes a milling cutter traversing the tool path to have a substantially constant engagement angle.

TEM—tool engagement milling.

Tool engagement—The region of contact between the tool and the workpiece at the in-process material boundary, frequently expressed as an angle.

Tool path—the path of the rotational axis of a single milling cutter when milling a workpiece.

DESCRIPTION OF THE PREFERRED EMBODIMENTS

Referring to the drawings, wherein like numerals are used to indicate like elements throughout the several figures and the use of the indefinite article "a" may indicate a quantity of one, or more than one of an element, there is shown in FIG. 1, a functional block diagram of a preferred embodiment of a computer aided manufacturing (CAM) system 10 for creating a numerical control (CNC) program which, when provided to a numerical control (NC) machine, enables the NC machine to produce a physical object having a shape conforming to a specified part boundary.

Preferably, the CAM system 10 is a standalone programmable computer platform having an open type of computer architecture of a kind commonly called a personal computer. Preferably, the CAM system 10 transfers the CNC program to a controller of an NC machine using one of any well known wire or wireless interface standards. Alternatively, the CNC program may be recorded on a removable media such as a floppy disk, a CD disk, a magnetic tape or a paper tape, for transfer to the NC machine. Preferably, the computer employs a Pentium IV™ microprocessor chip manufactured by Intel Corporation; a random access memory; non-volatile memory such as semiconductor read only memory, a hard disk, removable read/write memory drives such as a floppy disk drive and/or CD disk drive, a paper tape and/or a magnetic tape drive; a keyboard; a mouse; and a video display. Preferably, the CAM system 10 utilizes the Windows™ software operating system manufactured by Microsoft Corporation. However, the CAM system 10 is not limited to the aforementioned hardware and software environment. It would be clear to those skilled in the art, other types of computers and operating systems, such as those manufactured by Apple, Inc., or International Business machines could be used within the spirit and scope of the invention. Alternatively, the CAM system 10 could be integrated within another computer system such as the computer system of the NC machine.

Preferably, the CAM system 10 accepts information about the object to be machined and the workpiece from which the object is to be machined, from a computer aided design (CAD) computer program. Such a CAD computer program accepts dimensional information about the object to be formed and the workpiece from which the object is to be formed, and translates the dimensional information into models defining the object and the workpiece. Such CAD programs are well known to those in the art. Alternatively information about the object and the workpiece may be entered directly into the CAM system 10 by other known means, such as a tablet and/or by manual key entry through a user interface.

The CAD system 10 includes a computer aided manufacturing (CAM) computer program 18. Preferably, the CAM computer program 18 accepts the model output of the CAD program 18 for defining the parts boundary of the object to be machined and the boundaries of the workpiece. The CAM computer program 18 is also capable of accepting information about the properties of the material to be machined and of the milling cutters (also referred to as tools) for milling the object from the workpiece. Additional parameters associated with the milling operation such as the selection of a tool for each tool path, the area to be machined, and the programmed radial depth of cut and axial depth of cut to be used for each tool path may be entered by a user, i.e. NC programmer. Preferably, the user provided information is entered from a keyboard or by a mouse with the aid of on-screen dialog boxes displayed on a video display. Alternatively, some or all of the aforementioned parameters may be provided by the CAM computer program 18 itself.

The output of the CAM computer program 18 is a CNC program comprising a series of instructions which provide for positioning of the workpiece, tool paths, feed rates etc. by the NC machine, as further described below. Preferably, the language of the instructions generated by the CAM computer program 18 are compatible with the NC machine. The CAM computer program 18 may include a conversion routine for providing the instructions for specific NC machines. Alternatively, the conversion routine may be separate from the CAM computer program 18.

The CAM computer program 18 can be written in any suitable programming language, including (but not limited to) C, C++ and Java, and can be developed using standard programming practices to carry out the steps and techniques described herein.

Engagement, refers to the portion of the periphery of a rotating milling cutter that is in contact, at any given moment, with the workpiece. The engagement can be measured or expressed as an engagement angle, an engagement arc, or an engagement chord. The term engagement, is used hereafter as representing all of the foregoing.

The engagement angle for cutting a straight tool path is given by Eq. 1 as:

$$E = \cos^{-1}\left\{\frac{r-S}{r}\right\} \text{ where:} \quad (1)$$

E=engagement angle
S=radial depth of cut, and
r=radius of the milling cutter.

Figure 2A:
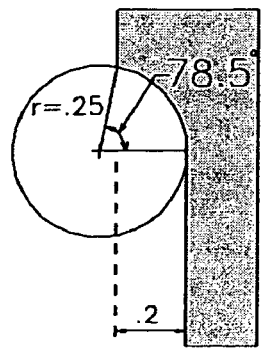
FIG. 2a is an illustration of a tool engagement for a straight path for a given radial depth of cut.
Figure 2B:
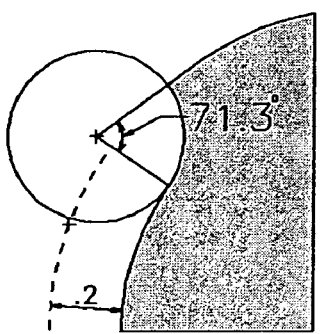
FIG. 2b is an illustration of the tool engagement for a convex path for the given radial depth of cut.
Figure 2C:
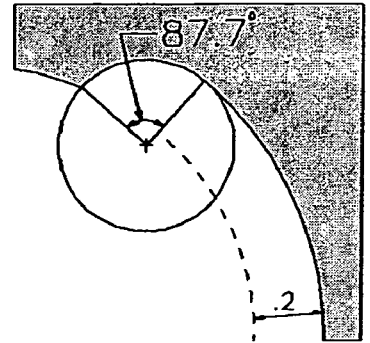
FIG. 2c is an illustration of the tool engagement for a concave path for the given radial depth of cut.

The engagement angle changes when a tool path changes from a straight path to a curve path. FIG. 2 illustrates, by example, the effect on the engagement angle when the tool path changes from a straight line to a convex curve and to a concave curve using a tool with 0.25 inch radius and a fixed stepover (radial depth of cut) of 0.2 inch. As can be readily seen, compared with the engagement angle for cutting the straight line, the engagement angle decreases when cutting the convex arc and increases when cutting the concave arc. Consequently, if a specific radial depth of cut is selected for a straight tool path, the engagement angle will be different for curved tool paths.

The engagement angle for cutting a curved tool path with a radius of curvature R is given by Eq. 2 as:

$$E = \pi - \cos^{-1}\left\{\frac{2r^2 + 2R(S-r) - S^2}{2r(R-r)}\right\} \quad (2)$$

Figure 3:
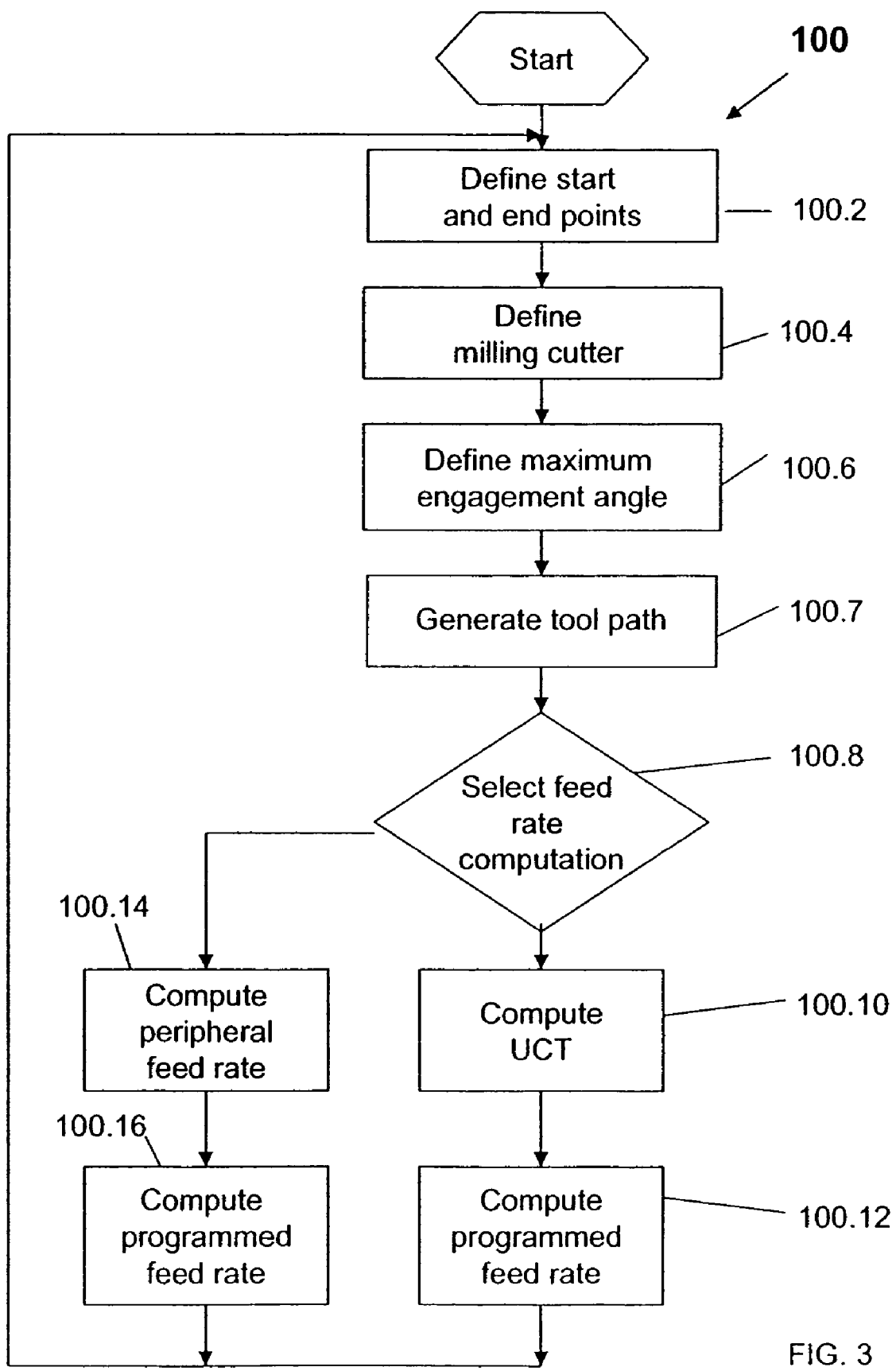
FIG. 3 is a functional flow diagram of a preferred method for controlling the feed rate of a milling cutter.

Referring now to FIG. 3, there is shown a process 100, for generating a CNC program by the CAM program 18, for milling a workpiece by an NC machine. Generally, the task of milling a workpiece is divided into a set of tool paths, where for each tool path a single milling cutter is used for milling a region of the workpiece. Each tool path comprises a series of passes, where for each pass the single milling cutter is in continuous contact with the workpiece. Associated with each tool path are machining conditions such as feed rate and spindle speed to be used by the same milling cutter for milling the region of the workpiece. Each tool path may be automatically determined by the CAM program 18 or determined by the NC programmer based on his experience, knowing the characteristics of the CAM program 18, the characteristics of the material, the shapes to be machined and the tolerances of the finished part. Based upon the characteristics of the region to be machined, the CAM program 18 determines a starting point (coordinate) and a stopping point for the tool path (step 100.2). Generally, unless the entire milling operation is limited to a simple shape, such as a circular pocket, more than one tool path may be required for rough milling of the workpiece. If a fine finish is required, at least one additional tool path may be required for finish milling.

Generally, a specific milling cutter (step 100.4) for a each tool path is selected based upon the NC programmer's experience and/or with guidance from the CAM program 18. Alternatively, the milling cutter may be automatically selected by the CAM program 18 based upon parameters of the tool path, the type of material, whether the tool path is a roughing cut or a finish cut etc. Of particular importance to the efficiency of the tool path in milling the workpiece is the radius and the number of flutes of the selected milling cutter, since from these parameters and the characteristics (e.g. hardness) of the material, a programmed feed rate is generally determined.

In each one of the preferred embodiments, a maximum engagement is predetermined for each tool path based on the characteristics of the selected milling cutter, whether the type of milling is climb milling or conventional milling and the type of material to be milled (step 100.6). Preferably, the maximum engagement is automatically determined and stored by the CAM program 18. Alternatively, the maximum engagement may be determined by the NC programmer. The input for determining the maximum engagement may also be a value of stepover, from which the engagement can be computed. Generally, for rough milling, the radial depth of cut is selected to remove the maximum amount of material from the workpiece for each pass of the milling cutter consistent with absence of chatter, vibration and excessive cutting force applied to the flutes of the milling cutter.

At step 100.7, a tool path is generated which expressly invokes criteria for controlling the engagement of the milling cutter over the entirety of a tool path. Such a process generates a tool path directly from the model information defining the object to be machined and information about the workpiece, without first generating an initial tool path without regard to the engagement of the milling cutter, and without the need to subsequently modify the tool path to correct for deficiencies in the tool path which would cause, for instance, rapid changes in tool load. Preferably, a single tool path is created for a region of the workpiece. Preferably, the tool path is generated by a direct process, where the tool path consists of one or more passes, and where the method comprises defining a maximum engagement of the milling cutter and defining each one of the one or more passes such that a value of the engagement, when traversing each one of the one or more passes, does not exceed the maximum value of engagement as described below.

Conventionally, the programmed feed rate of the milling cutter is based on the chip load and spindle speed recommended by the manufacturer of the milling cutter, as modified by the experience of the NC programmer. However, as discussed above, when the engagement angle is other than ninety degrees, and/or the tool path is curved, the tool load is more accurately represented by the undeformed chip thickness (UCT) and the value of the engagement angle of the milling cutter.

Accordingly, at step 100.8, in each of the preferred embodiments, either a criteria for controlling tool load or a criteria for controlling the peripheral feed rate of the milling cutter is selected for determining the feed rate of the milling cutter at points along the tool path. In the preferred embodiments, each tool path is divided into elements with each element of the tool path having a different curvature being treated separately. If the engagement of the milling cutter is relatively constant through an element, one feed rate is used for that element. If the engagement of the milling cutter varies through the geometry element, the element is broken into segments and different feed rates are applied to each based on the greatest engagement in that segment.

Preferably, the feed rate is adjusted to control the load on the milling cutter to be approximately equal to a predetermined value over a tool path as long as the peripheral feed rate is within an acceptable range.

The UCT at a point along a curved tool path with a radius of curvature R is found as:

$$UCT = r - \sqrt{r^2 - 2fr\cos(L) + f^2} \text{ where:} \qquad (3)$$

L=K−E;
K=π/2−I/2;
I=2*sin$^{-1}${f/(2*R)};
R=radius of curvature of the tool path at the point of calculation;
E=engagement angle at the point of calculation;
f=distance that a flute moves per revolution of the milling cutter, i.e. chip load; and
r=tool radius.

When the tool path is straight at the point of calculation, I=0 and equation 3 reduces to:

$$UCT = r - \sqrt{r^2 - 2fr\cos\left(\frac{\pi}{2} - E\right) + f^2} \qquad (4)$$

Preferably, the feed rate is controlled based on the value of the tool engagement and the UCT. Upon determining a shape of the tool path at a particular point, all of the parameters necessary for computing the feed rate at the point are known to the CAM program 18. Accordingly, if the UCT is selected as the basis for feed rate control, at step 100.10 the UCT and the engagement are calculated for points along the path and the programmed feed rate of the milling cutter is controlled at the points along the tool path to maintain the load on the milling cutter to be approximately equal to a predetermined value (step 100.12).

Alternatively, the feed rate may be based on the peripheral feed rate of the milling cutter (steps 100.14 and 100.16). The instantaneous peripheral feed rate at points along a tool path having a radial curvature R is related to the center-line feed rate by:

$$PFR = CFR\left(1 + \frac{r}{R}\right) \text{ for a concave tool path,} \qquad (5)$$

$$PFR = CFR\left(1 - \frac{r}{R}\right) \text{ for a convex tool path, where:} \qquad (6)$$

PFR = Peripheral feed rate; and
CFR = Center-line feed rate.

First Preferred Embodiment

When milling a tool path comprising a series of concentric circular arcs of different radius with the same milling cutter, the engagement of the milling cutter changes from one arc to the other if the radial depth of cut (stepover) for each of the arcs is fixed at a single value. The same is true of a spiral tool path having a constant rate of increase of the radius of the spiral.

Figure 24:
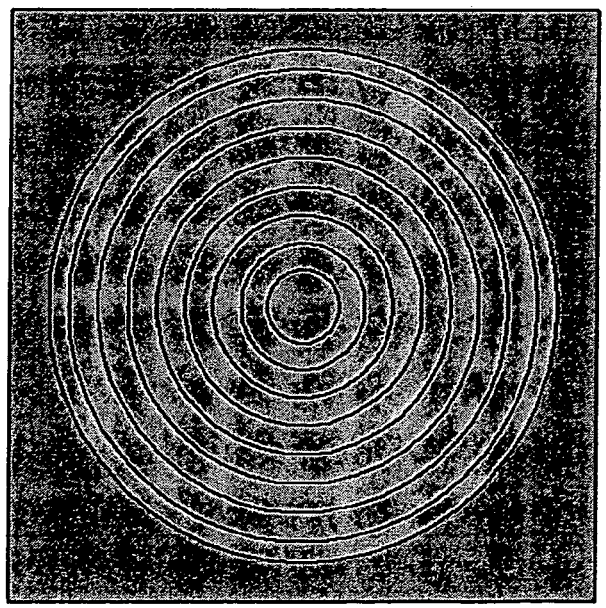
FIG. 24 illustrates a family of concentric circles according to a first embodiment.
Figure 25:
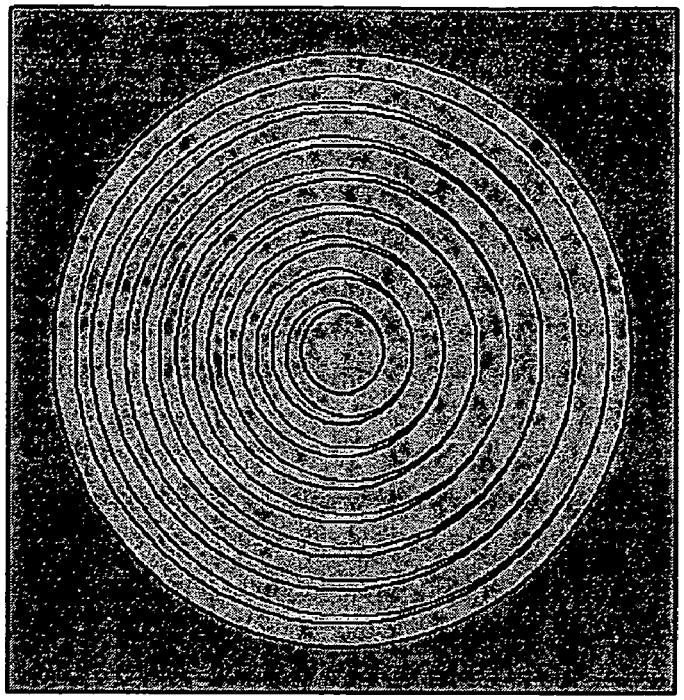
FIG. 25 illustrates arcs tangent to the concentric circles according to the first embodiment.
Figure 26:
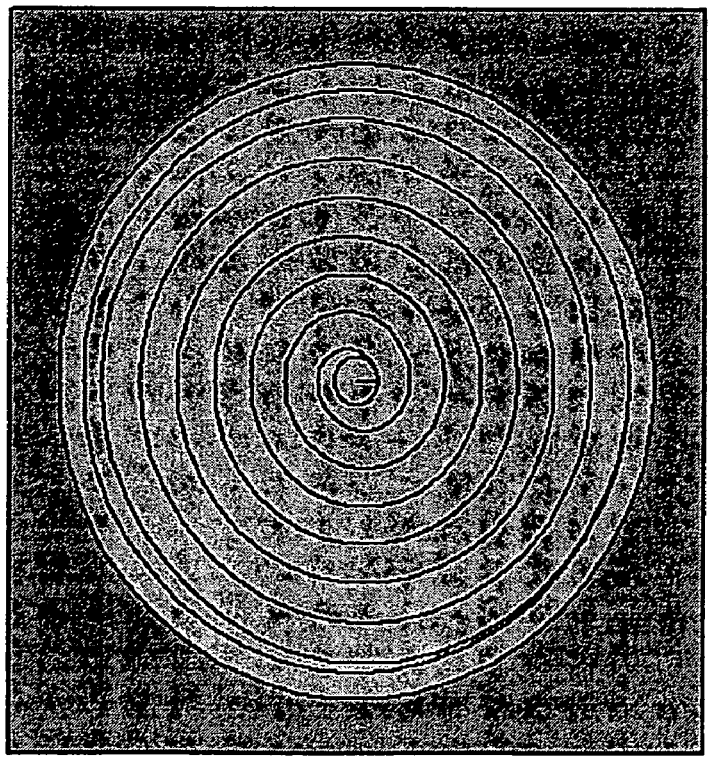
FIG. 26 illustrates a tool path joining the arcs together according to the first embodiment.
Figure 27:
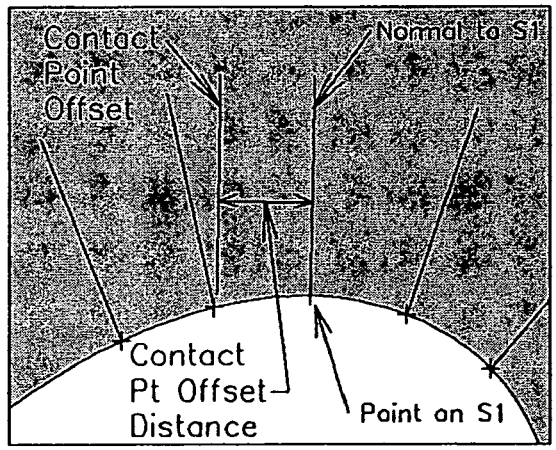
FIG. 27 illustrates constructing normals along an in-process material boundary.
Figure 28:
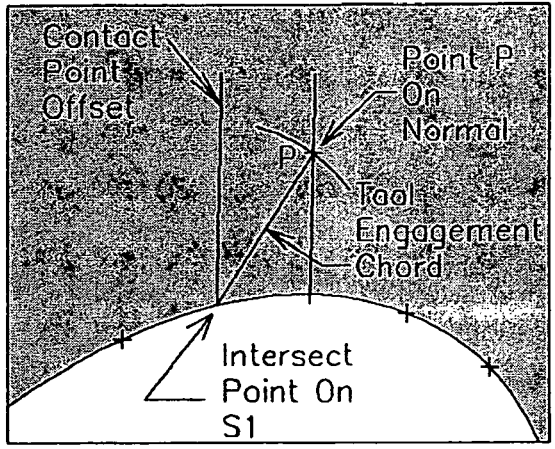
FIG. 28 illustrates constructing an engagement chord.
Figure 29:
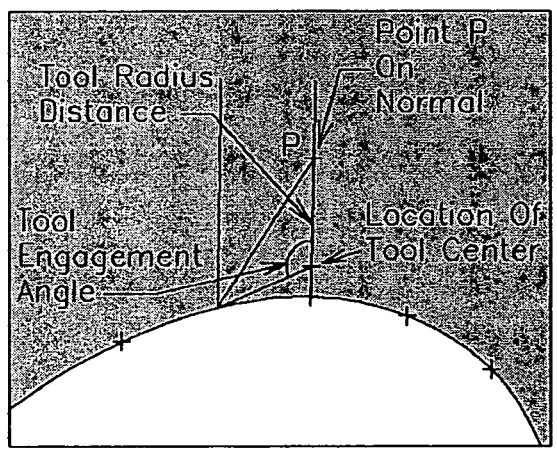
FIG. 29 illustrates creation of a tool center point.
Figure 30:
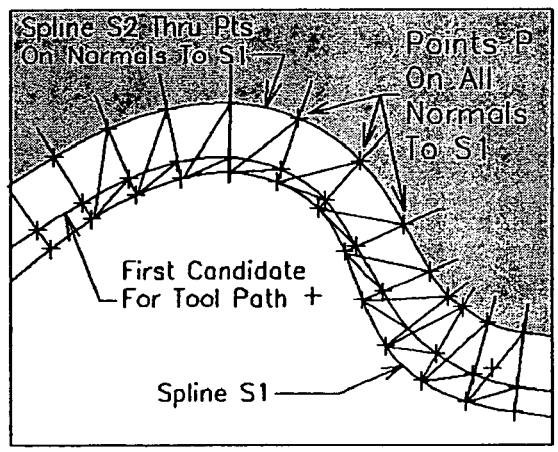
FIG. 30 illustrates fitting a spline to the series of points depicting a first trial boundary.

A tool path suitable for milling a circular pocket or a circular island, consisting of one or more passes, may be created for which the engagement of the milling cutter following the tool path does not exceed a predetermined maximum value and does not deviate by more than a predetermined amount from a predetermined value over a major portion of the tool path by: (1) defining a plurality of concentric circles, in which a radius of each one of the concentric circles is determined such that an engagement of the milling cutter milling each one of the concentric circles equals a target engagement which is substantially identical to the maximum value of the engagement (FIG. 24) and, (2) arranging each one of the one or more passes between adjacent ones of the concentric circles such that each end of each pass is tangent to one of the adjacent concentric circles (FIG. 25). The resulting generally spiral tool path (FIG. 26) causes an engagement angle to gradually and steadily rise from the starting position over a 360 degree path to a predetermined value, stay substantially constant at the predetermined value for a majority of the tool path and steadily and gradually decrease over a 360 degree path at the conclusion of the tool path. Note that the target engagement may be incrementally less than the maximum engagement depending on the size of the boundaries as described below.

In the first preferred embodiment, the radii of the concentric circles are determined as a function of the target engagement, the radius of an adjacent circle and the radius of the milling cutter. Where the adjacent circle is larger, the next smaller circle is determined in accordance with recursive equation 7a.

$$R2 = \sqrt{(R1-r)^2 + r^2 - 2r(R1-r)\cos(\pi - E)} \text{ where:} \qquad (7a)$$

r=radius of milling cutter;
E=target engagement angle;
R1=radius of the larger circle; and
R2=radius of the next smaller circle.

Where the adjacent circle is smaller, the next larger circle is determined in accordance with recursive equation 7b.

$$R2 = r\cos(\pi - E) + \sqrt{r^2\cos^2 E - r^2 + R_1^2} + r \text{ where:} \qquad (7b)$$

E=the target engagement angle of the milling cutter;
r=the radius of the milling cutter;
R2=the radius of the next larger circle;
R1=the radius of the next smaller circle, and The stepover between each of the first circular arcs is found by equation 8.

$$S = R1 - R2 \qquad (8)$$

The shape of each one of the arcs arranged between the concentric circles is chosen such that the value of the engagement of the milling cutter traversing the tool path is either gradually and steadily increasing, substantially constant or gradually and steadily decreasing, based on the location of the arc in the tool path.

A connecting pass consisting of a first circular arc and a second circular arc that meets the above criteria may be constructed between each pair of adjacent concentric circles by making one end of each of the first and the second circular arcs tangent to one of the adjacent concentric circles and joining the opposite end of each of the first and the second circular arcs to each other such that the pass thus formed is tangent continuous at the point of the joined arcs.

Figure 4:
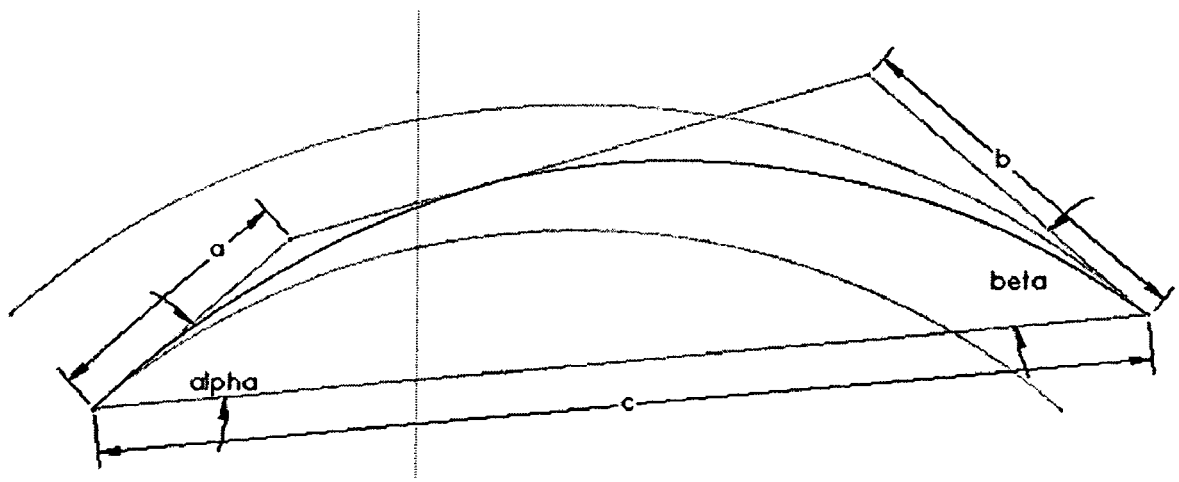
FIG. 4. is a diagram of showing the construction of a two arc fillet according to a first preferred embodiment.

FIG. 4 is a diagram of showing one method for constructing a blend, in this case a two arc pass, where the two circular arcs have radii $R_1$ and $R_2$. The distance c, from the start point of the left hand circular arc to the endpoint of the right hand circular arc and the angles $\alpha$ and $\beta$ are computable from geometry. The distances of the lines labeled a and b are unknown. The distance between the ends of lines a and b must be a+b because the two lines on the left must be the same length (namely, a) and the two lines on the right must also be the same length (namely, b). Letting a=b, equation 9 may be solved for a.

$$2a^2[1-\cos(\alpha+\beta)]+2ac(\cos\alpha+\cos\beta)-c^2=0 \quad (9)$$

The join point of the circular arcs is at:

$$\frac{1}{2}(a\cos\alpha + c - a\cos\beta), \frac{1}{2}(a\sin\alpha + a\sin\beta) \quad (10)$$

The distance between the join point and the start of the pass is h. This is the length of the chord of the leftmost segment that joins the ends of the two tangent lines of the leftmost arc, which can be computed from a, $\alpha$, and $\beta$. The radius of the leftmost arc is then simply computed from the relationship of equation 11.

$$h = \frac{2ar}{\sqrt{a^2 + r^2}} \quad (11)$$

The radius of the rightmost arc can be determined similarly One skilled in the art would recognize that other blending techniques that would maintain a tangent continuous tool path could be used.

Preferably, a median circle, having a radius equal to $$\frac{R1 + R2}{2}$$

is defined between each pair of concentric circles, wherein each one of the one or more passes is arranged between one of the concentric circles and one of the median circles such that each pass is tangent to a concentric circle and to a median circle. Preferably, when constructing a tool path for a circular pocket comprising the set of passes, each one of the passes is a semicircle, where the ends of each of the semicircles are joined to each other such that the ends are tangent continuous at the point of joining.

Preferably, the first semicircle in this set begins tangent to a starting-hole circle, and ends tangent to a circle whose radius is the median of the radius of the starting-hole circle and the second (next larger) concentric circle in the set. The next semicircle begins tangent to the end of the first semicircle, and ends tangent to the second concentric circle in the set. The previous two steps are repeated until the set of semicircles is complete. The result is a tangent contiguous chain of semicircles extending from the radius of the starting hole to the radius of the part boundary.

Preferably, the radius r and center offset C for each semicircle are found from $$r_k = \frac{R_k + R'_k}{2}; \quad (12)$$

$$C_k = \frac{R'_k - R_k}{2}; \quad (13)$$

$$r_{k+1} = \frac{R_{k+1} + R'_k}{2} \quad (14)$$

$$C_{k+1} = \frac{R'_k - R_{k+1}}{2} \text{ where:} \quad (15)$$

$R_k$ is the kth concentric circle as numbered from the center of the concentric circles and $R_k'$ is a virtual circle having a radius of $$R'_k = \frac{R_k + R_{k+1}}{2}.$$

Typically, when milling a circular pocket, a starting hole is formed at the center of the circular pocket and the milling proceeds from the radius of the starting hole to the part boundary. The series of material boundaries as calculated by equation 7a may result in the radius of material boundary formed by the last circle to be computed (the inner circle) to not coincide with the radius of the starting hole. Similarly, if the series of material boundaries is calculated from equation 7b, the last circle to be computed may not coincide with the part boundary. These occurrences could cause the engagement angle of the final milling cut to deviate excessively from the maximum engagement angle in order to match the last material boundary to the part boundary or could require the milling cutter to cut air at the beginning of the tool path. Consequently, in the first preferred embodiment, the target engagement of the milling cutter is marginally decreased to align the first and the last concentric circles with the boundaries by (a) defining a largest one of the concentric circles on a first boundary, (b) determining if a smallest one of the concentric circles coincides with a second boundary; and (c) if the smallest concentric circle does not coincide with the second boundary within a predetermined value, decrementing the target engagement and repeating steps b and c until the smallest concentric circle coincides with the second boundary within the predetermined value. Alternatively, the process for aligning the circles with the boundaries may be performed by working from the inside to the outside.

Figure 5:
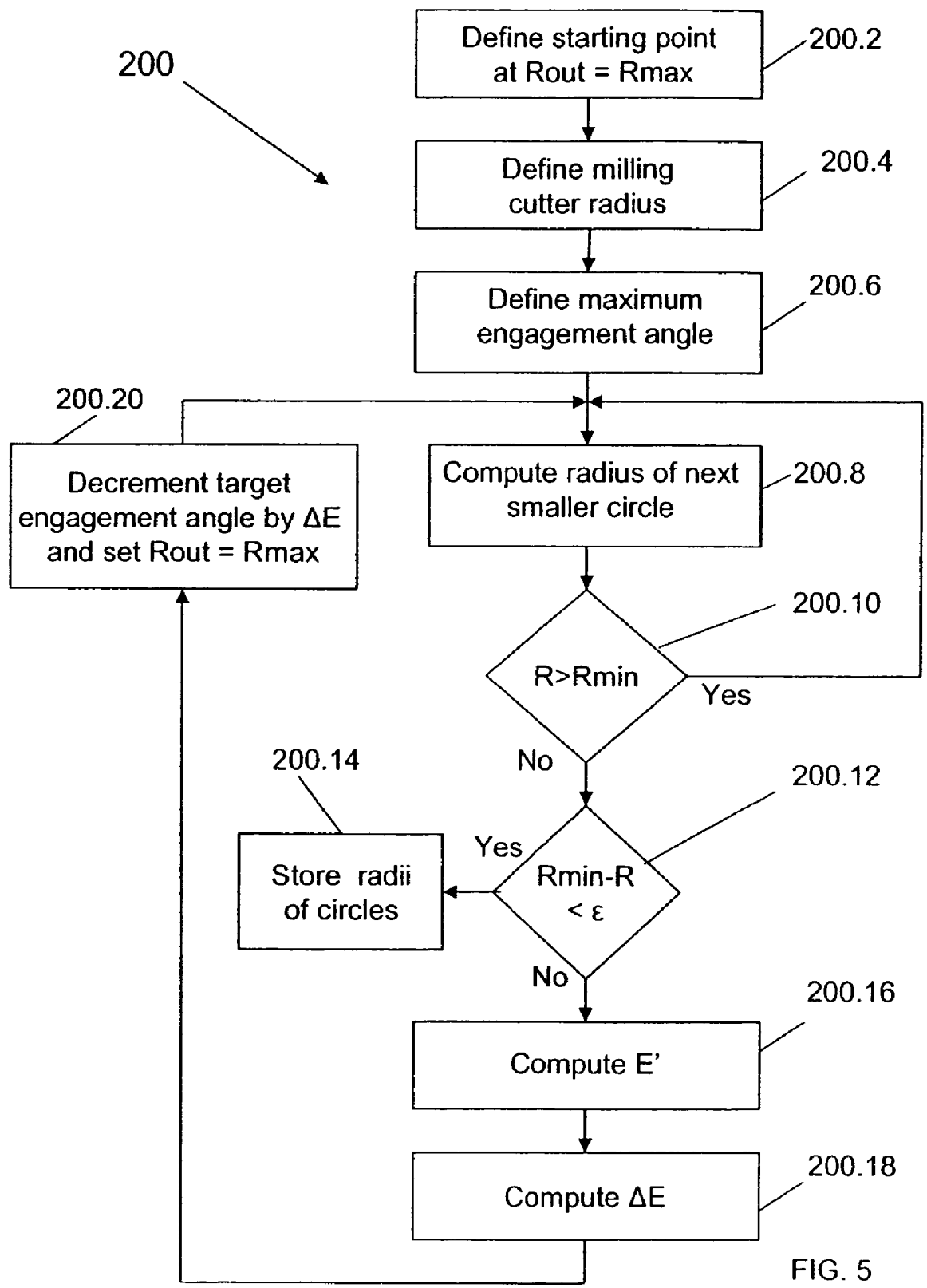
FIG. 5 is functional flow diagram of a preferred process for determining a predetermined value of engagement according to the first preferred embodiment.

FIG. 5 shows a preferred process 200 for adjusting the target engagement angle so as to align the material boundaries milled by the milling cutter traversing the first and the last circular arcs with the part boundary and the boundary of the starting hole. At step 200.2, a starting point on the part boundary and an ending point on a boundary of the starting hole are determined. At step 200.4, a radius of milling cutter are defined. At step 200.6, a target engagement is determined for the tool path based on the characteristics of the selected milling cutter and the type of material to be milled. At step 200.8, the radius of the circular material boundary R2, adjacent to the part boundary R1, is computed based on equation 8. At step 200.10, the radius of R2 is compared with the radius of the starting hole boundary. If the radius of R2 is greater than the radius of the starting hole boundary, step 200.8 is repeated using the radius of the last computed material boundary as the basis for the computation until the radius R2 is less than the radius of the starting hole boundary.

At step 200.12 the radius of the material boundary formed by the milling cutter having a radius less than the radius of the starting hole is compared with the radius of the starting hole. If the difference between the radius of the starting hole and the radius of the material boundary is less than a predetermined value, the circle radii are computed as offset from each of the material boundaries by the milling cutter radius, and the radii are stored (step 200.1). If on the other hand, the difference between the radius of the starting hole and the radius of the material boundary is greater than the predetermined value, the target engagement is decremented by computing the difference (step 200.18) between the target engagement and the engagement angle of the last material boundary, E' (step 200.16), decrementing the target engagement in proportion to the difference at step 200.20 and repeating steps 200.8 to 200.18 until the difference between the last computed material boundary and the starting hole boundary is within the predetermined value.

Second Preferred Embodiment

Figure 6:
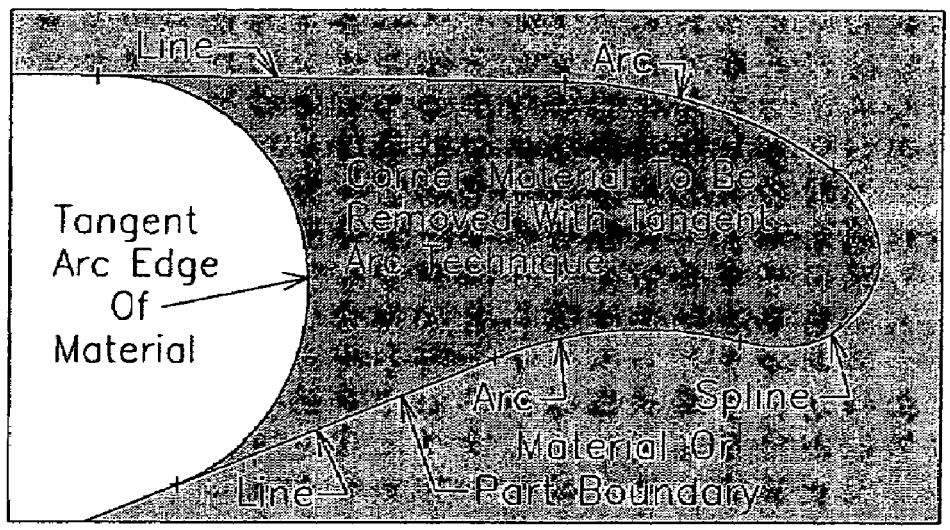
FIG. 6 is an illustration of a region in a workpiece having an arbitrary material or part boundary.
Figure 7:
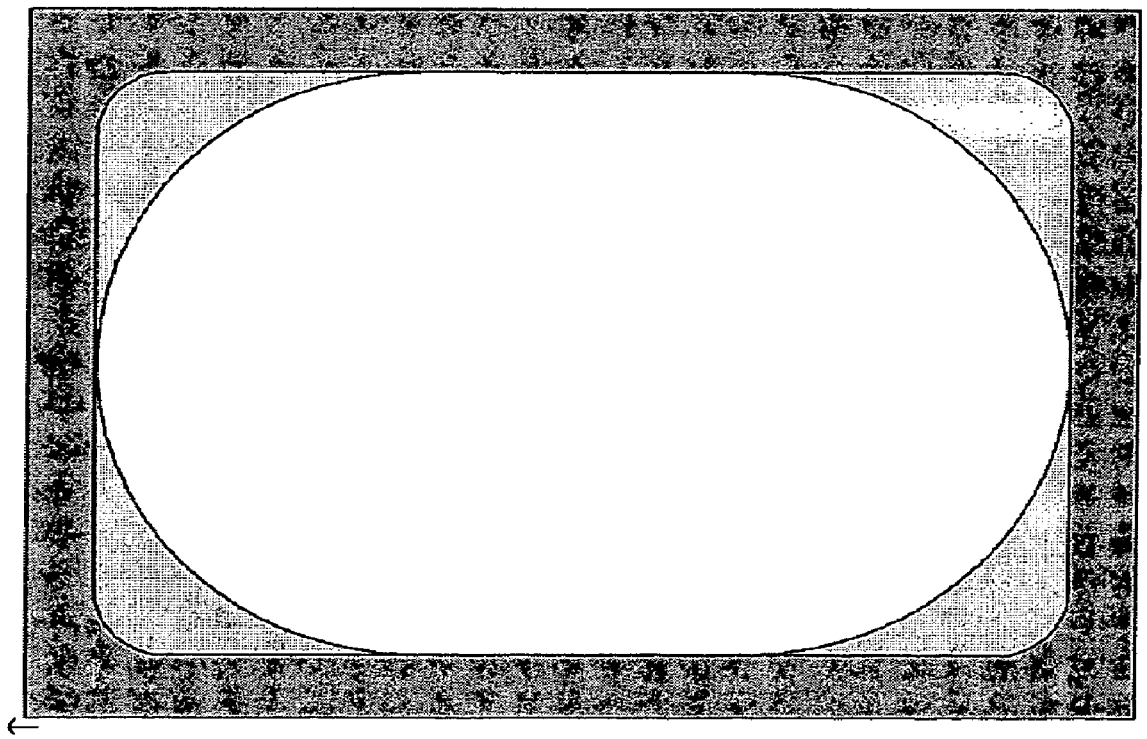
FIG. 7 is an illustration of typical case where material has been left remaining in the corners of a rectangular pocket by previous passes of a tool.

Referring now to FIG. 6 there is shown an illustration of the general case where material to be milled has been left in a region of a workpiece by a previous pass of the milling cutter. The region of material to be milled has first, second and third sides, the first side being a current in-process material boundary and meeting at respective ends, the second and the third sides. The second and third sides comprise a part or an in-process material boundary of arbitrary shape consisting of a set of lines, arcs and splines. FIG. 7 illustrates a typical case in which the remaining material to be milled is in the four corners of a rectangular pocket.

A common characteristic of the above examples is that the in-process material boundary is an arc that is substantially circular and greater in radius than the radius of the active cutting tool. Preferably, the milling cutter to be used to mill at least a substantial portion of the remaining material is the same as the previous milling cutter, thus obviating the need for replacing the previous milling cutter for milling at least a substantial portion of the material to be milled.

The second preferred embodiment generates a tool path comprising one or more advancing passes which successively advance into the region. Where the second and third sides are not parallel, the tool path is created by: (1) defining a maximum engagement of the milling cutter; and (2) determining a radius of curvature and a center of the current in-process material boundary; determining a radius of curvature and a center for each of the advancing passes based on the radius of curvature and center of the of the current in-process material boundary; an angle representative of the intersection of tangents to the second and the third sides, a radius of the milling cutter and the maximum engagement. The tangents are formed at the meeting points of the current in-process material boundary with respectively the second side and the third side. Preferably, each advancing pass is tangent to both the second side and to the third side.

Figure 8A:
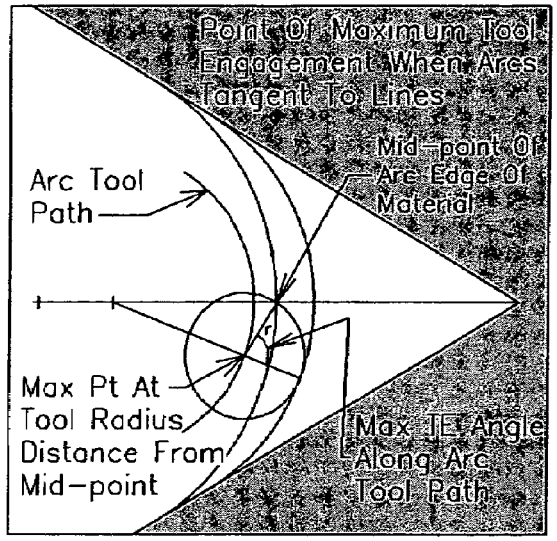
FIG. 8a is an illustration showing that the location of the maximum engagement of the milling cutter is where the leading edge of the milling cutter reaches the midpoint of the pass.
Figure 8B:
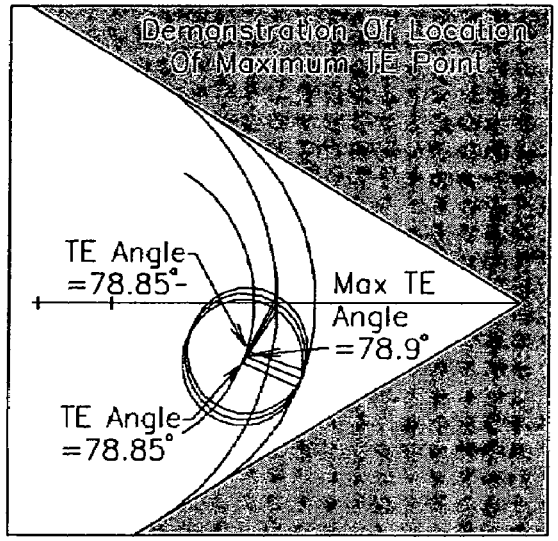
FIG. 8b is an illustration showing that the engagement is smaller on either side of the maximum engagement point.
Figure 9:
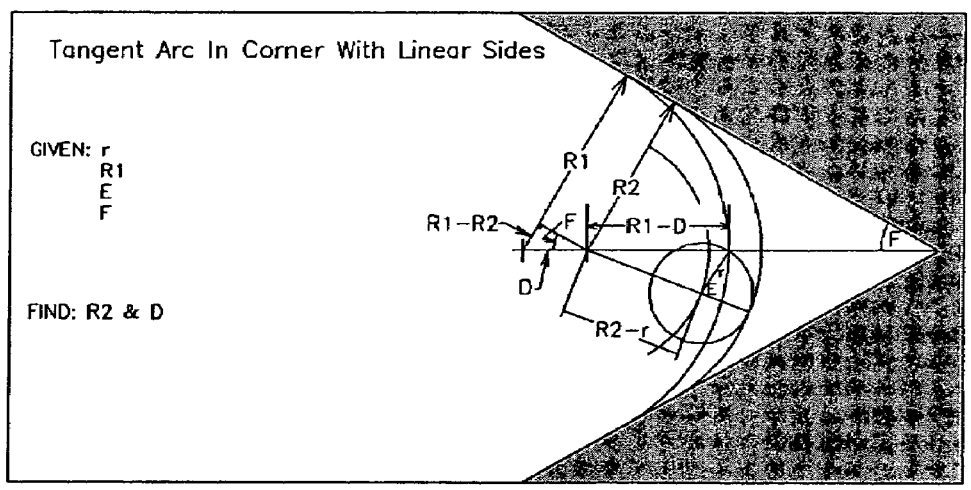
FIG. 9 is an illustration defining the parameters for calculating the radius and stepover of the next in-process material boundary according to a second preferred embodiment.

In general, the advancing passes do not have a common center. Consequently, the engagement angle may not be constant over a pass. Typically, the engagement angle reaches a maximum at a single point along the pass. Where the new in-process material boundary is tangent to the two sides, the point of maximum engagement can be precisely determined. FIG. 8a shows the determination of the point of maximum engagement. In such a case, the milling cutter is at the point of maximum engagement when the leading edge of its periphery reaches the midpoint of the in-process material boundary. The point of maximum engagement is at the same location whether the sides converge, diverge, or are parallel. FIG. 8b shows that the engagement angle is smaller both just before and just after this point.

Since the point of maximum engagement is known, the location and radius of the next in-process material boundary can be calculated such that the maximum engagement angle is not exceeded.

The radius of curvature and the center of each advancing pass of the tool path is computable from knowledge of a radius of curvature and a center of a current in-process material boundary, the angle of the part boundary and the radius of the milling cutter, where the angle of the part boundary is defined as the included angle formed by the intersection of tangents to the part boundary at the points where the current in-process material boundary intersects the part boundary.

Where the boundary is two converging lines each successive in-process material-boundary radius is smaller than the previous radius and is tangent to the boundaries. The tool path for milling each newly calculated radius is a tool-radius offset from that radius. Where the boundaries diverge each successive in-process material-boundary radius will be larger than the previous radius and tangent to the boundary. Equations 16-18 provide a method for determining the radius and center of each advancing pass. Alternatively, an iterative search method could also be used for finding the center and the radius of each successive in-process material boundary.

$$R_2 = (\tan^2 F)\left(B + \sqrt{B^2 - \left(\frac{1}{\tan^2 F}\right)\left(2r^2(\cos E - 1) + R_1^2\left(\frac{1}{\sin F} - 1\right)^2\right)}\right) \quad (16a)$$

where the boundaries are converging, $$R_2 = (\tan^2 F)\left(B - \sqrt{B^2 - \left(\frac{1}{\tan^2 F}\right)\left(2r^2(\cos E - 1) + R_1^2\left(\frac{1}{\sin F} - 1\right)^2\right)}\right) \quad (16b)$$

where the boundaries are diverging, $$B = r(\cos E - 1) + R_1\left(\frac{1}{\sin^2 F} - \frac{1}{\sin F}\right) \quad (17)$$

$$S = \frac{R1 - R2}{\sin F} \text{ where:} \quad (18)$$

r=the radius of the milling cutter;
F=the included half-angle formed by an intersection of tangents to the part boundary at the point of intersection with the current in-process mater boundary, where 0>F<90 degrees;
E=the maximum engagement angle;
R2=the radius of a new pass;
R1=the radius of the current in-process material boundary, and
S=the difference in centers along a median line between the passes.

Figure 10:
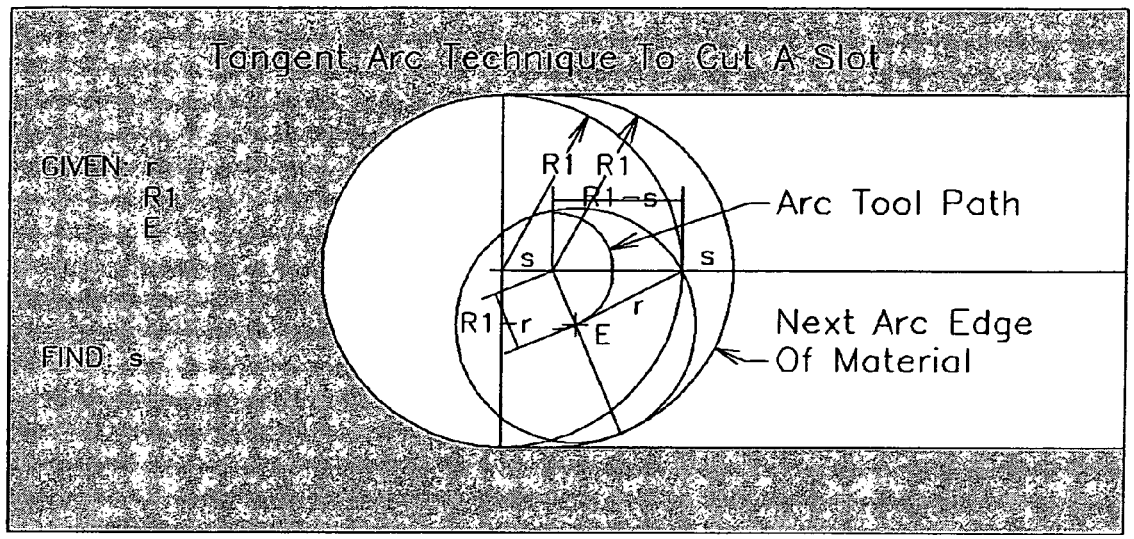
FIG. 10 is an illustration defining the parameters for calculating the stepover for a slot according to the second preferred embodiment.

The second preferred embodiment is useful for expanding a starting hole into a slot. FIG. 10 shows a starting circle expanding into a slot that has sides that are parallel lines. In such cases, a series of 180-degree arcs is machined, in sequence, until the desired length of the slot is achieved. The radius of each of the 180-degree arcs is equal to the radius of the starting hole. The spacing S for the centers of the advancing passes is based on the radius of curvature of the in-process material boundary, the radius of the milling cutter and the maximum engagement. Equation 19 is a mathematical formula for finding the required spacing. An iterative search method can also be used to find the required spacing.

$$S = R1 - \sqrt{R1^2 - 2rR1 + 2r^2 + (2rR1 - 2r^2)\cos E} \quad (19)$$

In cases where the part boundary elements are other than two straight lines, iterative search routines may be used to determine the radius and center of each successive pass. The preceding mathematical formulas are used to determine the engagement that results from each repetition of the steps in the iterative search routine.

Figure 11:
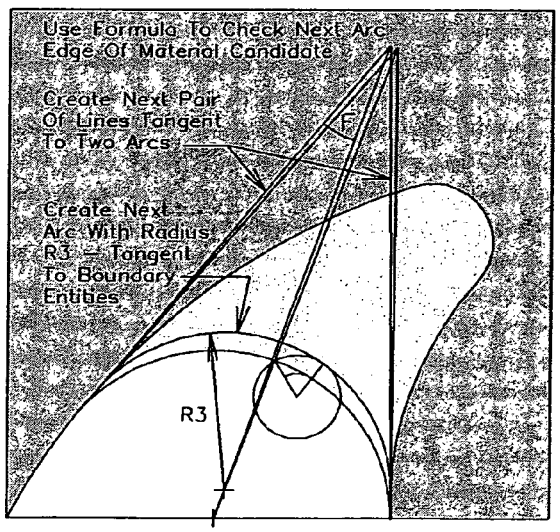
FIG. 11 is an illustration of the steps of an iterative search according to the second preferred embodiment.

FIG. 11 shows the first three steps in this iterative search. Two construction lines are created that are tangent to the two boundary arcs in FIG. 11. The construction lines intersect at an angle equal to 2 F degrees. For calculation purposes, the construction lines serve as the lines in the converging-lines case described above. Equations 16-18 may be applied to find an in-process material boundary. A key difference in the case of non-linear part boundaries is that the point of maximum engagement does not occur where the periphery of the tool reaches the midpoint of the current in-process material boundary. Rather, the point of maximum engagement occurs when the periphery of the milling cutter reaches the intersection point between the current in-process material boundary and the bisector of the angle formed by the two construction lines. If the arc, which is tangent to the two construction lines, not the two boundary arcs, is sufficiently close to the tangent arc candidate, the candidate arc is used as the next in-process material boundary. If the arc is not sufficiently close, then the radius of the arc found with the formula is used to create the next candidate arc, tangent to the two boundary arcs.

Figure 12:
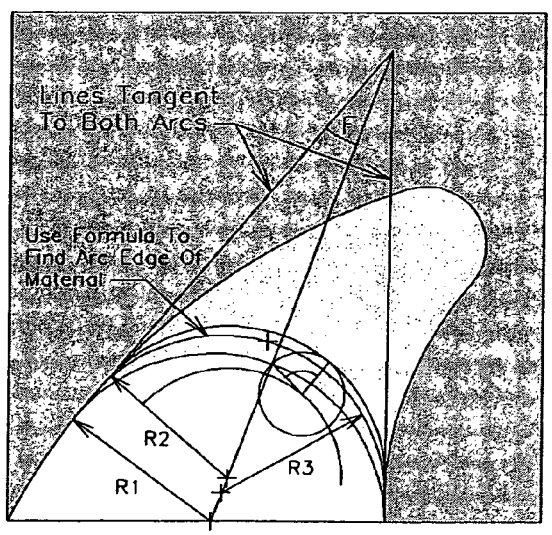
FIG. 12 is another illustration of the steps of an iterative search according to the second preferred embodiment.

FIG. 12 shows a continuation of the iterative process. The midpoint obtained after using the formula is used to create a new arc, tangent to the two boundary arcs. The process is repeated until the required next in-process material boundary is found.

Figure 13:
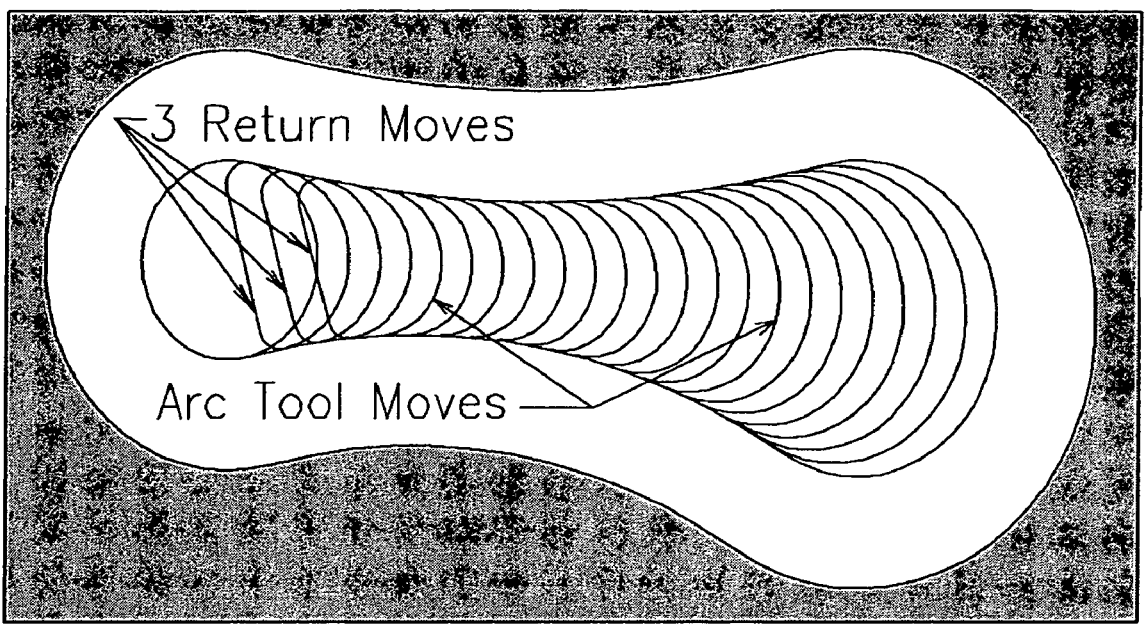
FIG. 13 is an illustration of the tool path for milling a converging and diverging region according to the second preferred embodiment.

FIG. 13 illustrates using the method of the second embodiment to generate the passes required to machine a region in which the boundary entities first converge and then diverge, without exceeding the maximum tool engagement angle. In some cases, one pass is all that is required to machine an area. In other cases, multiple passes are required. The return lines 3, in FIG. 13 illustrate one way to connect the multiple passes. In generating the tool path required to machine multiple passes, any of several known methods can be used to connect between the multiple required passes.

Third Preferred Embodiment

Figure 14:
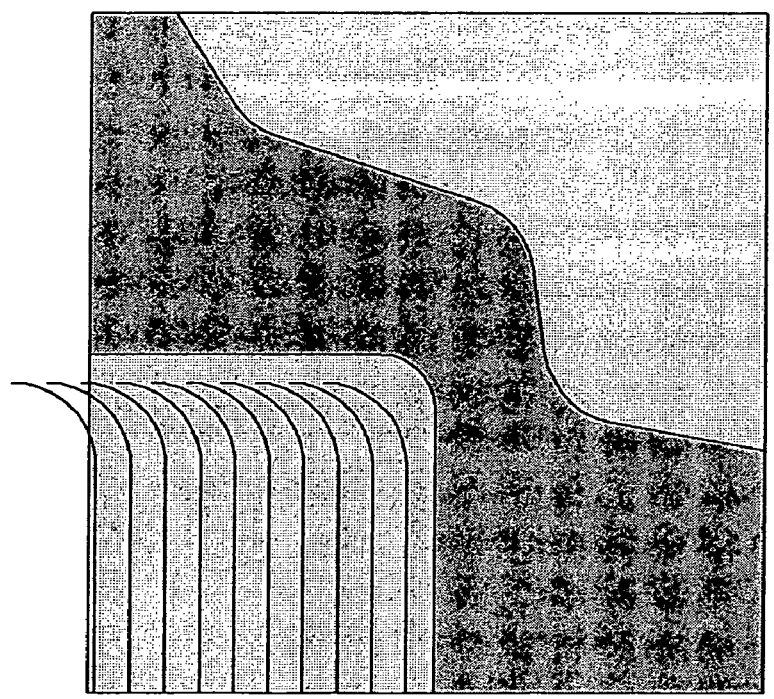
FIG. 14 is an illustration of a workpiece in which a step, open on two sides, is to be milled.

Referring to FIG. 14, there is shown a workpiece in which a step, which is open on two sides, is to be milled. A conventional method for milling such geometry is that of milling in parallel, straight lines (direction parallel strategy). However, milling in parallel straight lines toward a part or a material boundary results in a large increase of the engagement of the milling cutter as the milling cutter approaches the boundary. Consequently, spindle speeds and/or feed rates for the passes must be set for the highest possible engagement (up to 180 degrees), which limits the efficiency of material removal.

To avoid excessive engagement of the milling cutter, the method of the third preferred embodiment generates a tool path of one or more parallel passes separated by a predetermined value of a stepover. The shape of the tool path is based on the radius of the milling cutter to be used for milling, and a maximum engagement of the milling cutter. Each pass comprises a first arc and a tangent continuous second circular arc. The first arc of each pass is typically straight, but may be arcuate. The in-process material boundary formed by the end of the second arc opposite to the end joining the first arc is tangent to the part or a material boundary and has a radius selected such that the engagement of the milling cutter traversing the tool path becomes equal to and does not exceed the maximum engagement.

Since each first arc blends into a circular arc of a known radius, the engagement angle during any given pass is greatest at the point where the first arc joins the second arc. Consequently, the maximum engagement angle is selected based on the radius of the second arc. Further, since the first arcs are generally parallel to each other, the starting angle of the second circular arc of all the passes is identical. Consequently, equation two can be used to determine the value of the stepover between the passes. It follows then, that the radius of the second circular arc determines the actual spacing (stepover) between the passes.

The radius of the second arc can be virtually any size the user desires, since any radius larger than the radius of the milling cutter will work. Preferably, the radius of the second arc is between two and six times the radius of the milling cutter. More preferably, the radius of the second arc is approximately four times the radius of the milling cutter.

Fourth Preferred Embodiment

When a milling cutter enters the workpiece from outside an in-process material boundary and attains a maximum engagement of the milling cutter, there is one and only one path that the milling cutter can follow and maintain without exceeding the maximum engagement while also maintaining its cutting direction (climb/conventional).

The fourth preferred method is a method for generating a tool path having a maximum engagement when the tool path enters the workpiece from outside a material boundary at a predetermined attitude. The resulting tool path is referred to hereafter, as a tool engagement curve. The method includes generating, by a direct process, a tool path consisting of one or more passes. The method includes defining a maximum engagement of the milling cutter and defining each one of one or more passes such that a value of the engagement, when traversing each one of the one or more passes, does not exceed a maximum value of engagement. In the fourth embodiment, the tool path is determined by first locating a starting point inside the in-process material boundary such that the value of engagement of the milling cutter, when located at the starting point is substantially equal to the maximum engagement;

then successively locating each of one or more points inside the in-process material boundary such that the value of engagement of the milling cutter, when located at each one of the one or more points, is substantially equal to the maximum value of engagement, and then arranging the one or more passes between the one or more successive points to thereby connect together the starting point and each one of the successive one or more points to form the tool path.

Preferably the location of each of the one or more successive points is found by establishing the initial attitude angle perpendicular to the trailing edge of the engagement angle, rotating the attitude of the tool path to decrease the engagement in the next leg of the tool path. The cutter can now be moved further into the material at this new attitude until the leading edge of the engagement angle contacts the material boundary, thereby establishing the location of the next point. Preferably, the leading edge of the engagement angle is temporarily advanced by a factor of ½ of the rotation of the attitude at each step. However, the leading edge may be advanced using a different factor of the rotation. Further, it is unnecessary to advance the leading edge of the engagement at each step and the tool path generated by the fourth embodiment would still generate a tool path having an engagement less than the maximum value.

Preferably the location of each of the one or more successive points is found by projecting a first straight line from a preceding point, the first line being at a first angle with respect to the attitude of the tool path at the preceding point; projecting a second straight line from the preceding point, the second line being at a second angle with respect to a leading edge of the engagement angle of the milling cutter, the second angle being equal to one-half the first angle; determining an intersection of the second straight line projection with the in-process material boundary; and determining an intersection of a straight line having a length equal to a radius of the milling cutter and originating at the an intersection of the second straight line with the in-process material boundary with the first line.

Figure 15:
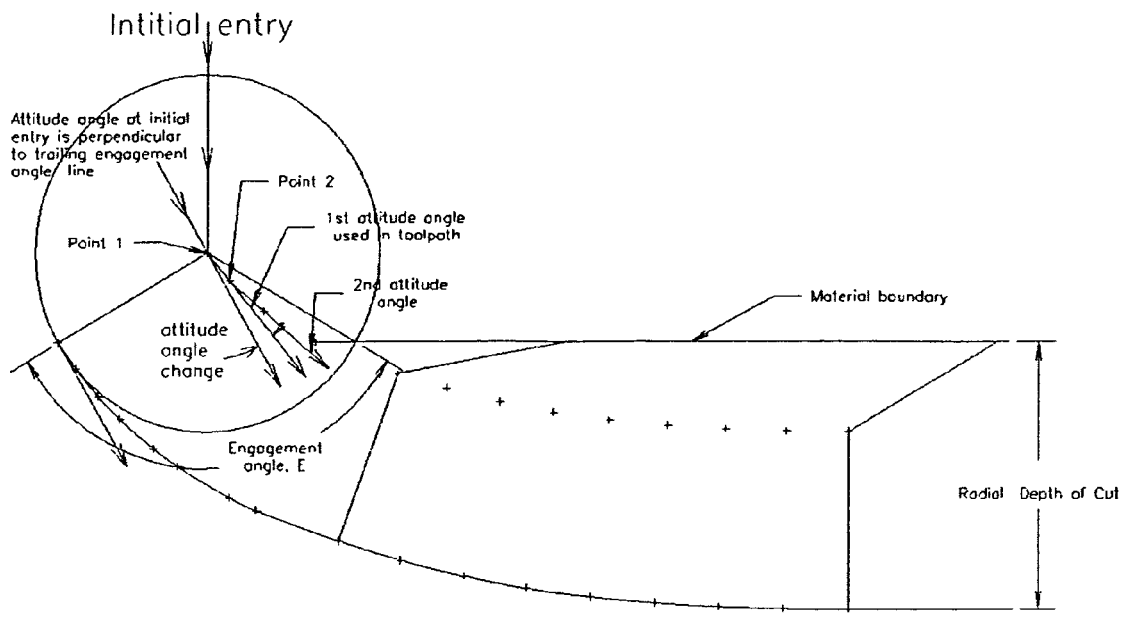
FIG. 15 is an illustration of a tool path proceeding in the workpiece until a predetermined engagement is reached.

An example of constructing the tool engagement curve in accordance with the fourth embodiment is shown in FIG. 15. In FIG. 15, the path of a milling cutter is shown approaching the in-process material boundary on a linear path that is normal to the boundary with the object of reaching a specified radial depth of cut in the shortest distance consistent with a maximum engagement angle. In FIG. 15, the tool path proceeds into the material until the milling cutter reaches the maximum engagement. It is apparent that the tool path cannot move farther in a direction perpendicular to the in-process material boundary without the milling cutter exceeding the maximum engagement. However, by rotating the attitude of the tool path, defined as being perpendicular to the trailing leg of the engagement angle, by an amount, the milling cutter can be moved farther into the material in a new direction without exceeding the maximum engagement. This is because, as the milling cutter is rotated into the new attitude, the engagement angle is decreased momentarily, enabling the milling cutter to be moved forward along the tool path until the maximum engagement angle is once again reached.

Preferably the above described steps are repeated, with the tool path attitude being incremented and the tool moved along each new attitude, enabling the tool to proceed farther and farther into the material. Preferably, the amount of rotation is decreased as the tool approaches programmed radial depth of cut. Decreasing the amount of rotation as the tool approaches programmed radial depth of cut allows the spacing between the points to remain relatively constant.

Preferably, a smooth tool path is defined by fitting a spline curve to the tool path such that the value of engagement of the milling cutter traversing the tool path does not deviate from the maximum value by more than a predetermined amount.

The entry attitude angle is not required to be normal to the surface to use the method of the fourth embodiment. The process of the fourth embodiment can be employed if the tool initially enters the material at any angle, or along a curved path. The process of the fourth embodiment also provides a means for entering material from the side while controlling the engagement angle. Further, the in-process material boundary need not be straight but can be any shape. In addition, while the method of defining the points along the tool path has been stated as a geometrical construction, the method is not limited to a geometrical construction. A mathematical formula can be also used in place of the construction method for computing the points along the tool path.

Alternately, a variation of the above described embodiment can be used to remove material that remains between the in-process boundary and a part boundary. The only difference in this case is that the part boundary must not be gouged. Therefore, when the tool reaches the part boundary in the process of proceeding toward full engagement, the tool follows the part boundary, and continues to follow the part boundary until the tool reaches a point when engagement can again be increased. In this manner a tool can be driven around an entire part boundary or any portion of it in order to remove remaining material without exceeding engagement. If engagement is not reached in some sections of this pass, the process can be repeated, as necessary.

A further use for the method of the fourth embodiment is the creation of a tool path for milling a circular pocket or a circular island. Preferably, the attitude of the tool path entering the workpiece is tangent to the material boundary, but it could be at any angle to it. The method comprises generating a tool engagement curve from the entry point into workpiece such that a spiral-like arc is formed. By extending the tool path around until it is reaches the beginning of the in-process material boundary and then following it, a continuous spiral-like tool path is created by repeatedly defining the location of successive points inside the material boundary such that the value of engagement of the milling cutter, when located at each point, is substantially equal to the maximum value of engagement and arranging the passes between the successive points, the tool path may be extended indefinitely either inwardly or outwardly in a generally spiral path such that the value of the engagement of the milling cutter is substantially constant and does not exceed a predetermined maximum value.

Fifth Preferred Embodiment

To accurately machine a pre-existing boundary, the tool path of the last cut along that boundary must be at a tool-radius offset from that boundary. However, if an engagement angle is to be held substantially constant during the last cut, the in-process material boundary that is present prior to the commencement of the last cut must be of a specific shape, i.e., the in-process material boundary must be closer to the part boundary where the part boundary is concave and farther from the part boundary where the part boundary is convex. This is illustrated in FIG. 16, which shows the in-process material boundary that must exist if the final cut, also shown, is to maintain a substantially constant engagement angle.

Figure 16:
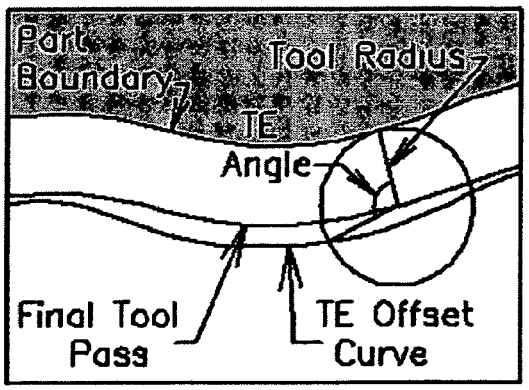
FIG. 16 is an illustration of the in-process material boundary required for milling the final cut with a substantially constant engagement.
Figure 17:
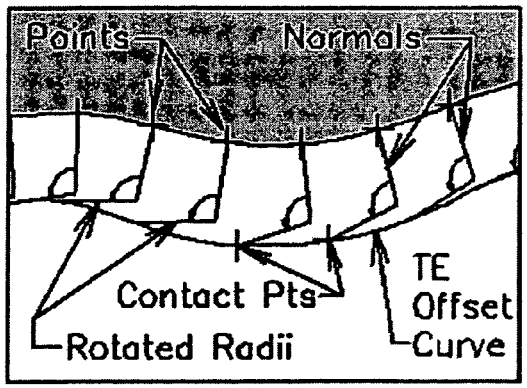
FIG. 17 illustrates a graphical construction of the in-process material boundary according to a fifth preferred embodiment.

Referring now to FIGS. 16-19, there is described a fifth preferred embodiment of a method for generating a tool path for forming an in-process material boundary adjacent to a part boundary where the value of the engagement angle of a milling cutter milling the part boundary does not deviate from a maximum engagement angle by more than a predetermined amount when traversing the tool path. FIGS. 16-17 illustrates a graphical construction method that can be used to generate an in-process material boundary that results in a substantially constant engagement angle when cutting a part boundary (or any material boundary) of arbitrary shape. A normal, of tool-radius length, is generated at each of a plurality of points arranged along the part boundary. The normals are then rotated through the engagement angle. Generating a smooth curve through the endpoints of these rotated normals produces the required in-process material boundary. For any given point on the part boundary, a single corresponding point exists on the in-process material boundary. Those skilled in the art will recognize that the accuracy of the result is dependent upon the number of part-boundary points used, with an increased number of points producing a more accurate curve.

In general the engagement offset method for determining the tool path for milling the material boundary immediately adjacent to the parts boundary, includes the steps of: selecting a plurality of first points along the parts boundary; determining a plurality of second points, each second point being located: (1) at a distance L=N sqrt (2−2 cos E) from a corresponding first point, and (2) at an angle of (pi-E)/2 from a normal to the parts boundary at the corresponding first point, E being the engagement angle and N being a predetermined length of the normal; and generating a smooth curve which intersects a plurality of third points, each of which third points is offset from a corresponding one of the second points and which is perpendicular to a smooth curve which passes through the second points.

There are other viable methods of generating the in-process part boundary. FIGS. 18 and 19 illustrate a method of "driving" a geometric entity along the part boundary while maintaining a constant orientation of that entity with a line tangent to the part boundary at each point. In FIG. 18, the driven entity is the engagement chord. In FIG. 19, the driven entity is the leading side of the engagement angle.

As described, the method of the fifth embodiment generates the in-process material boundary required for machining a known boundary at a constant tool-engagement angle. It is possible, using iterative procedures, to do just the opposite—that is, for any given in-process material boundary, a tool path can be calculated that removes material from that boundary while maintaining a substantially constant engagement. This requires calculating the next in-process material boundary and generating a tool path that produces that next in-process material boundary.

Preferably, a first trial tool path is generated by constructing normals along the existing in-process material boundary and creating lines parallel to and offset from each normal by an amount that represents the contact point of the leading edge of the milling cutter. From the contact point, an engagement angle line is projected back to, and intersecting, a normal. The intersection of the engagement angle line and the normal creates a tool-center point for a first trial tool path. The point where the tool radius intersects the normal creates a point for the first trial next-in-process material boundary. A spline, S1, is fitted through the series of points depicting the first trial boundary.

If the first trial next in-process material boundary were accurate, generating a curve according to the method of the fifth embodiment from the in-process material boundary would recreate the original in-process material boundary. With this in mind, and referring to the method of the fifth embodiment, it can be seen that a normal, equal in length to the radius of the tool, projected from a point on this next in-process material boundary defines the location of the center of the tool. The end point of a vector from this center point, equal to the tool radius and at an angle necessary to define the engagement angle, reveals the accuracy of this trial next-in-process material boundary. Unless the original in-process material boundary is a straight line or a radius, the vectors need to be adjusted by an iterative process as follows:

The iterative process shifts the original vectors that were normal to the original in-process material boundary such that they are coincident with the projected normals from the trial next-in-process material boundary. Note that when these vectors are rotated they will no longer be normal to the original in-process material boundary. Then the tool-center point is moved up or down a normal projected from the trial in-process material boundary until the leading edge of the tool vector rests on the original in-process material boundary.

The process creates a series of points where the tool radius intersects the normal from the next in-process material boundary. A spline, S2, is fitted through these points, creating a second trial next-in-process material boundary. For the next iteration, new normals are projected from S2 and the process is repeated. Each time the normals from the new next-in-process material boundary shift, the tool representation, consisting of a tool radius vector and attached edge-engagement vector, is shifted so that the end of the engagement vector rests on the original in-process material boundary. Iterations are repeated until the necessary degree of accuracy is attained.

Sixth Preferred Embodiment

Referring now to FIGS. 20-23 there is shown a sixth preferred embodiment for generating a tool path for a region defined by a closed boundary. The method includes the steps of: creating a family of concentric indexed circles at each of selected points within the region; connecting together the circles of adjacent families of circles having an identical index to form isoloops; and forming a spiral like path by blending between the isoloops.

The first step for generating the tool path is to find points in the region that are: (1) equidistant from three or more boundary points (branch points); (2) in the middle of a constricted area of the pocket (neck points) and (3) as close to the boundary as one can get with the selected milling cutter (corner points). Preferably, the well known Medial Axis Transform (MAT) is suitable for finding the above points although other methods could also be used for finding the branch points, neck points and corner points. FIG. 20 illustrates the result of executing a MAT for a trapezoidal region.

Each branch point, corner point and neck point is a candidate for locating a family of concentric circles. Each circle family consists of one or more concentric circles. The radius of each one of the concentric circles is such that an engagement of the milling cutter milling each one of the concentric circles is equal to a target value substantially equal to the maximum value of engagement. Preferably the radii of the circles are computed using one of the procedures of the first preferred embodiment. As described in connection with the first preferred embodiment, the target engagement may be incrementally different from the maximum engagement depending on the dimensions of the boundaries. Circle families are generated at each branch point. Circle families are generated at neck points and corner points, depending on certain parameters such as the width of the neck, the size of the milling cutter, etc. The circle families are joined together in a graph structure called a circle graph (see FIG. 21).

Figure 22:
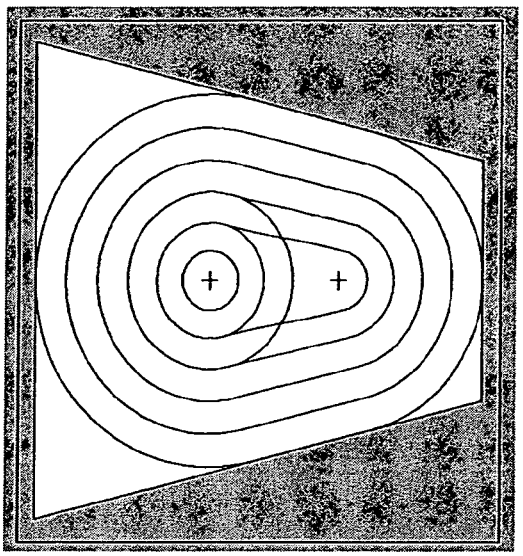
FIG. 22 illustrates forming concentric circles and isoloops according to the sixth embodiment
Figure 23:
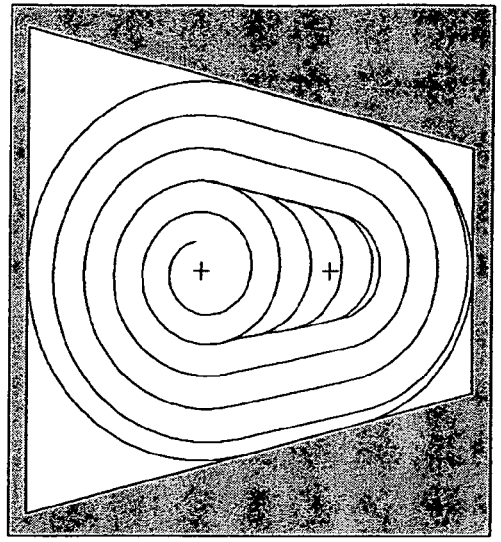
FIG. 23 illustrates the in-process material boundaries formed from a spiral-like tool path according to the sixth embodiment.

After creating the circle graph, the circles of each family are indexed by numbering the circles from the outside in an ascending scale. The circles having the same index are then joined together into isoloops, so called because the isoloops are created by joining circles of the same index together. The joining process creates some combination of arcs (pieces of the original circles) and blends joining those pieces together. FIG. 22 is an illustration of the circle families being joined by the isoloops.

Preferably, the lines joining two circles together are constructed by: constructing two offsets from the boundary, c1(t) and c2(t) where c1 is a distance R1 from the part boundary and c2 is a distance R2 from the part boundary. A blending curve $c(t)=(1-2t^3+3t^2)*c1(t)+(3t^2-2t^3)* c2(t)$ is then constructed. Inspection of c(t) shows that the position and first derivatives match c1 at t=0 and c2 at t=1. That means that c(t) is actually a tangent continuous blend. c(t) is not generally a circular arc. Consequently, c(t) is approximated with a tangent continuous sequence of circular arcs using a two arc pass according to the first embodiment. The two arc pass is fitted to c(t) by measuring the error between the circular arcs and c(t) and halving the value of c(t) recursively until the error is acceptably small. One skilled in the art would recognize that other blending techniques that would maintain a tangent continuous tool path could be used to connect the circles.

A spiral-like tool path (FIG. 23) is then created by blending between successive isoloops. The blends are generated using the same exact blending function used for c(t) above. The only difference is that c1(t) and c2(t) are the isoloops instead of offsets. The blending paths are replaced with sequences of arcs using the previously described recursive algorithm.

Seventh Preferred Embodiment

The first preferred embodiment describes a method for creating a generally spiral tool path for milling a circular region in which the value of the engagement of the milling cutter does not deviate by more than a predetermined amount over a major portion of the tool path. The method uses pairs of semicircles which are non-concentric with respect to the center of the circular geometry. The region may be defined by the boundaries of a pocket or the boundaries of an island.

Figure 31:
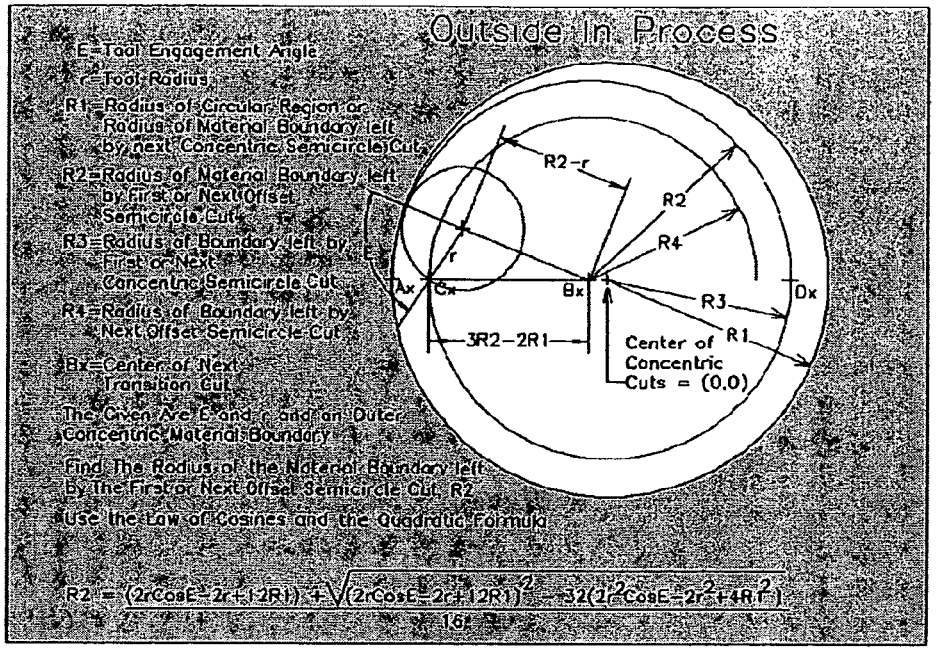
FIG. 31 illustrates the geometry for determining the parameters of the tool path in accordance with the seventh preferred embodiment.
Figure 32A:
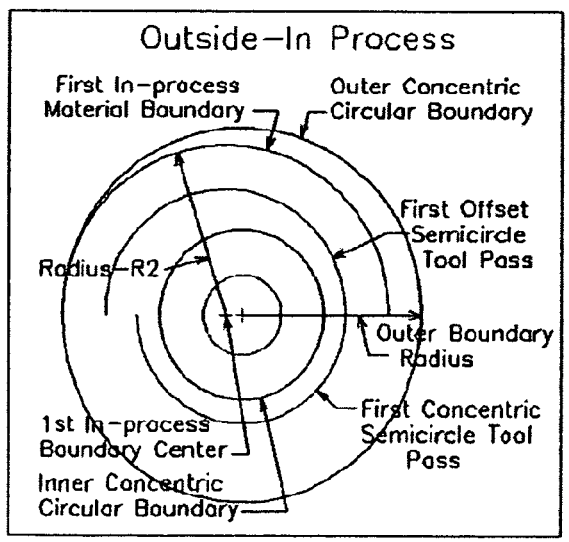
FIG. 32a illustrates the in-process material boundaries formed by generating the tool path with an outside-in process.
Figure 32B:
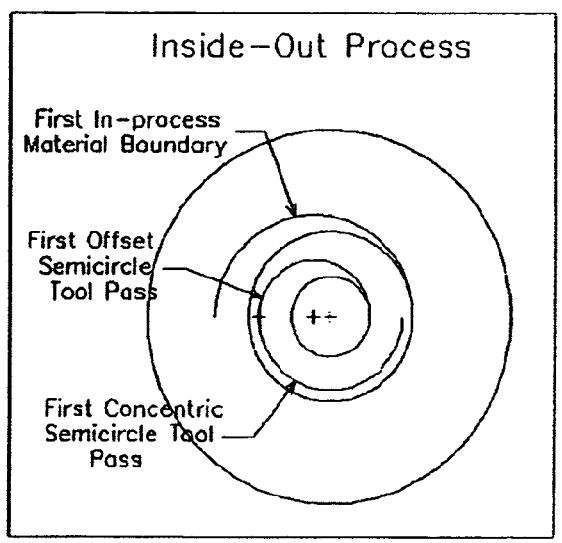
FIG. 32b illustrates the in-process material boundaries formed by generating the tool path with an inside-out process.

Referring now to FIGS. 31 and 32, there is shown a seventh preferred embodiment for creating a tool path for a circular region which uses semicircles to create a generally spiral tool path. The seventh preferred embodiment differs from the first preferred embodiment in that the engagement of the milling cutter is not maintained constant within a predetermined amount over a major portion of the tool path but does have the property that the tool engagement is held to a value less than a predetermined maximum value.

In the seventh preferred embodiment, the region is bounded by inner and outer concentric circular boundaries. The method for generating the tool path comprises the steps of defining a first set of passes, the first set of passes being semicircles, each one of the semicircles in the first set having a center at a center of the inner and the outer concentric circular boundaries; and a second set of passes, the second set of passes being non-concentric semicircles, each one of the semicircles in the second set having a center offset from the center of the concentric circular boundaries by an amount greater than or equal to an amount of an adjacent inner non-concentric semicircle and/or less than or equal to an adjacent outer non-concentric semicircle, wherein the amount of the offset and a radius of each one of the semicircles in the second set of passes and the radius of the passes in the first set of passes is based on the maximum engagement, and wherein the first set of passes and the second set of passes are joined in an alternating tangent continuous fashion to form a generally spiral tool path for removing material between the inner boundary and the outer boundary.

When any individual semicircle of the set of concentric semicircles is traversed by the milling cutter, the engagement angle will be constant during the machining of that semicircle, but the engagement angle will not necessarily be the same for each of the concentric semicircles. When any individual offset semicircle is traversed by the milling cutter, the engagement angle will increase until it reaches a point of maximum engagement, but the engagement will not exceed the maximum. Preferably, each semicircle in the concentric set is generated based on an endpoint of a corresponding semicircle from the offset set. The radius and the center point of each offset semicircle tool pass can be calculated from the radius and center point of the circular in-process material boundary created by that tool pass. Knowing the radius of the cutting tool, the radius of the outer boundary, or the radius of the in-process material boundary created by the next inner concentric tool pass, the maximum engagement angle, the radius and center point of the in-process material boundary created by each offset semicircle can be calculated. Starting at the outer boundary (FIG. 32a), the radius and center point of the in-process material boundary created by the first offset semicircle pass can be calculated by the equation shown in FIG. 31, where the offset is found from the difference between a radius of the outer boundary and a radius of the in-process material boundary adjacent to the outer boundary. The corresponding first offset semicircle tool pass that creates the adjacent in-process material boundary is created as a tool pass radius offset from this in-process material boundary.

The first semicircle in the concentric semicircle set can now be constructed, tangent to the first offset semicircle tool pass at its endpoint and concentric to the circular outer boundary. The equation in FIG. 31 is used again to calculate the next offset semicircle, based on the in-process material boundary created by the first concentric semicircle rather than the outer boundary. The next concentric semicircle is then constructed based on this offset semicircle. The process is repeated until the next offset semicircle tool pass intersects the circular tool pass that created the inner circular boundary. When that occurs, a final 180-degree offset semicircle is generated between the final concentric semicircle (the smallest concentric semicircle) and the circular tool pass that created the inner circular boundary. This results in one tangent continuous set of semicircle tool passes that remove the material between the inner boundary and the outer boundary that can be traversed by the milling cutter while never exceeding the maximum engagement angle.

A similar equation as that shown in FIG. 31 can be used to calculate the semicircle sets in the opposite direction, from the inner boundary hole towards the outer boundary. (See FIG. 32b). In this case, calculations continue until an offset semicircle is generated that intersects the circle that is a tool radius offset from the outer circular boundary. When that occurs, a final 180-degree offset semicircle is generated between the final concentric semicircle (the largest concentric semicircle) and the tool radius offset of the outer boundary.

When the chain of passes is machined, the offset semicircle that was constructed last will be machined at a lesser engagement angle. Since this last-calculated offset semicircle will be shorter in length if the semicircle sets are calculated from the outer boundary towards the inner boundary, this method of calculation will produce a more efficient tool path. In either case, a final cut must be generated along the part boundary to ensure the complete removal of material.

It is also possible to arrive at the radii and center points of the offset arcs using iterative search routines. The transition from the last offset arc to the inner or the outer boundary can be smoothed by adding a blend. Alternatively, the maximum engagement can be decreased iteratively, using the procedure of the first embodiment to match the sets of semicircles smoothly to the inner and outer boundaries.

Eighth Preferred Embodiment

Figure 33:
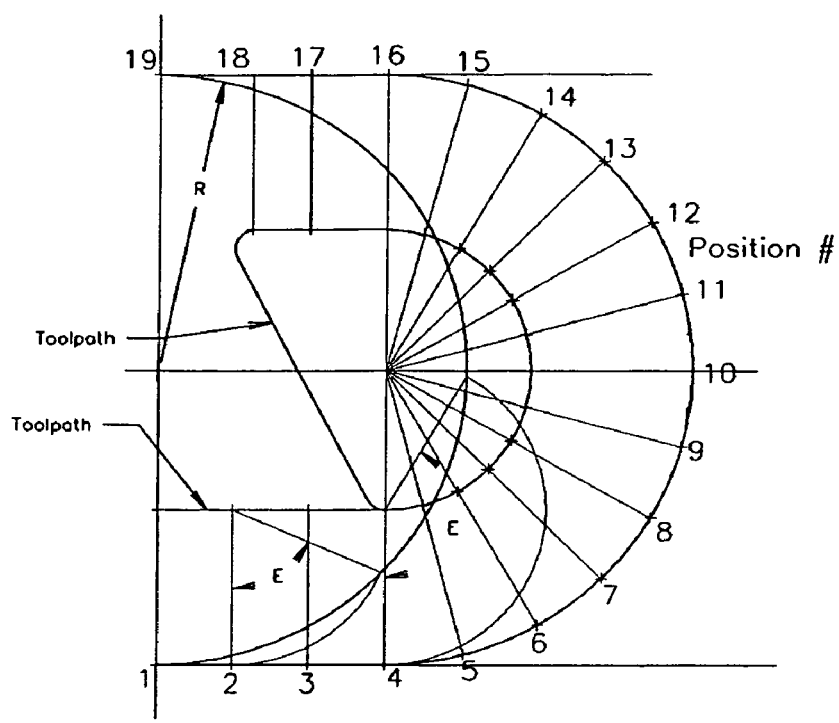
FIG. 33 illustrates the method of determining the engagement of a milling cutter milling a circular pass in a slot.
Figure 34:
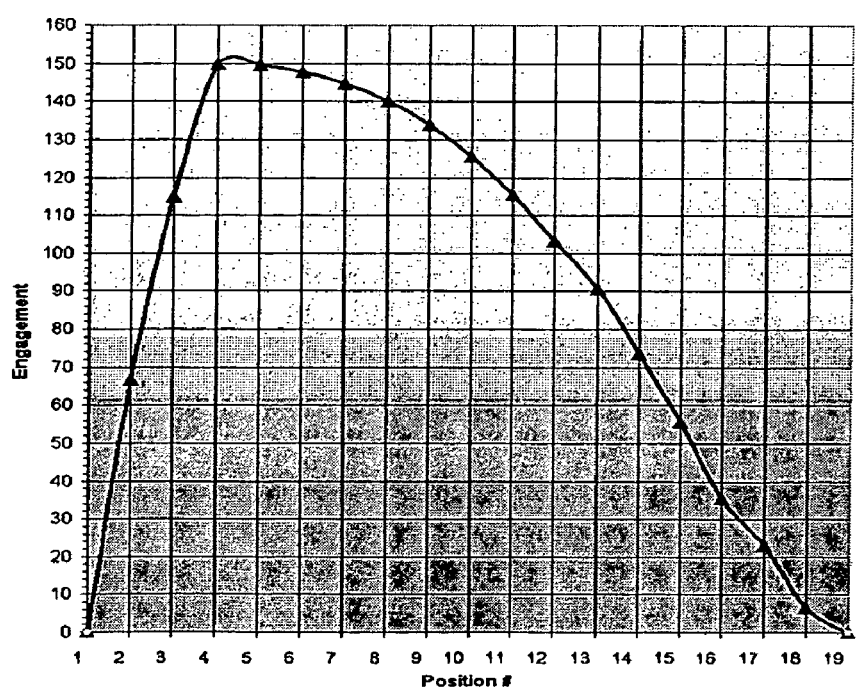
FIG. 34 illustrates the change of engagement over a circular tool path.

The second preferred embodiment discloses a method for expanding a starting hole into a slot based on a series of advancing passes, where the shape of each in-process material boundary resulting from each pass of the milling cutter is a substantially circular 180 degree arc. However, as shown in FIGS. 33 and 34, when each advancing pass has the shape of a substantially circular arc, the engagement of the milling cutter remains high for approximately the first half of the pass, but falls off rapidly in the latter portion of the pass.

Figure 35:
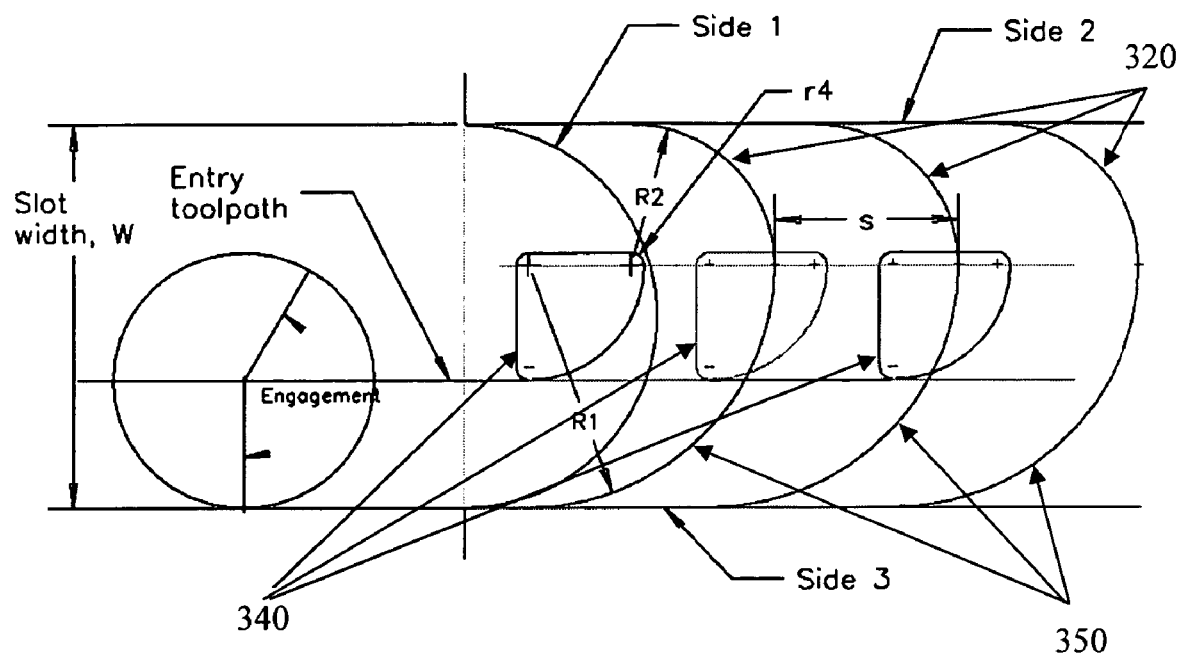
FIG. 35 illustrates the in-process material boundaries formed in a slot in accordance with the eighth embodiment.

Referring to FIG. 35 there is shown a tool path consisting of a series of passes 340 and a series of in-process material boundaries resulting from one or more passes 340 of a milling cutter which advances according to a predetermined pitch to mill a slot in accordance with the eighth preferred embodiment. Preferably, each pass 340 results in an in-process material boundary comprising a plurality of tangential continuous connected arcs including: (1) a first arc 350, tangent to a first side of the slot and having a radius of curvature greater that one-half the width of the slot, and (2) a second arc 320, tangent to a second side of the slot having a radius less than one-half the width of the slot and greater than the radius of the milling cutter. Preferably, each pass 340 consists of two circular arcs. However, the arcs need not be circular nor are the number of arcs in a pass 340 limited to two arcs. The eighth preferred embodiment, as described below, achieves higher material removal rates and improved efficiency compared to the method of the second preferred embodiment by maintaining a large value of the engagement of the milling cutter over a greater portion of each pass, thereby removing more material during each advancing pass.

In the eighth preferred embodiment, a ratio of the slot-width to the milling cutter radius is preferably in the range of 2.2 to 5. However the ratio of the slot-width to milling cutter radius may be any value greater than two. Preferably, the second arc 320 has a radius approximately equal to the sum of the smallest radius of the tool path and the radius of milling cutter, and preferably, has an arc length of between ninety degrees and one-hundred twenty degrees.

Where the width of the slot is less than or equal to three times the radius of the milling cutter, the radius of the first arc 350 is preferably made approximately equal to three times the radius of the milling cutter minus the radius of the second arc 320, and preferably, an arc length of approximately ninety degrees. Where the width of the slot is greater than three times the radius of the milling cutter, the radius of the first arc 350 is preferably made approximately equal to the width of the slot minus the radius of the second arc 320, and preferably, the length of the first arc 350 is made 90 degrees or less. However, the radius of the first arc 350 may be any value greater than one-half the width of the slot and the lengths of the first arc 350 and the second arc 320 could be larger or smaller than the preferred ranges and still be within the spirit and scope of the invention.

Preferably, the value of the pitch, and the radius of the first arc 350 and the radius of the second arc 320 are determined such that the maximum engagement of each pass 340 is substantially equal to the predetermined maximum value of the engagement.

Preferably, the pitch "p" is determined by the computer program or the equivalent steps shown in Table I by first selecting a value "E" for the maximum engagement of the milling cutter, a value "r" for the radius of the milling cutter, and a value "r4" representative of the smallest radius of the tool path, generally set to one tenth of the radius of the milling cutter. However, one skilled in the art would recognize that the program of Table I is only one of a number of ways of calculating the pitch. One skilled in the art would understand that the program of Table I is derived from the relationships inherent to the geometry of the multiple arc material boundary bounded on each end by a part or material boundary. Accordingly, other methods for determining the radius and the arc lengths of each portion of a multiple arc material boundary based on the inherent geometry are within the spirit and scope of the invention.

TABLE I

LABEL INPUTDATA
INPUT "Enter radius of tool,                    r ", r
INPUT "Enter Engagement angle in deg.,          E ", E
INPUT "Enter Width of Slot,                     W ", W
INPUT "Enter Smallest TP radius,                r4 ", r4
LABEL Start
R2=r+r4
IF W>(3*r)THEN ALT
LABEL V1
R1=(2*r)−r4
R3=R1−r
Ra=Sqrt(R3$^2$+r$^2$−2*R3*r*Cosine(180−E))
b=R1−R2
c=R1+R2−W
a=Sqrt(b$^2$−c$^2$)
A1=Acosine(c/b)
C1=90−A1
h=Sine(C1)*r4
f=Cosine(C1)*r4
J=E−C1
D1=180−J
k=Sine(D1)*r
k=ABS(k)
n=Cosine(D1)*r
m=k−h
g=n−f
t=SQRT(R2$^2$−M$^2$)
p=g+t
Ae=Acosine((a−g)/Ra)
Ar=Acosine(t/R2)
IF AE>Ar THEN ECIRCLE
GOTO END
LABEL Ecircle
R5=R3−r4
d=W−2*r−2*R4
f=R5−d
g=Sqrt(R5$^2$−f$^2$)
R6=R2−Ra
h=Sqrt(R6$^2$−f$^2$)
p=g+h
GOTO End
LABEL ALT
R2=r+r4
R1=W−R2
Ra=Sqrt(R3$^2$+r$^2$−2*R3*r*Cosine(180−E))
R6=R1−Ra
p=R6
LABEL End TABLE I-continued

```
INPUT "Find new pitch? n ends program ____ ",A$
    IF A$ = "n"
        CLOSECONSOLE
            END
        ELSE
        GOTO INPUTDATA
    ENDIF
```

Figure 36:
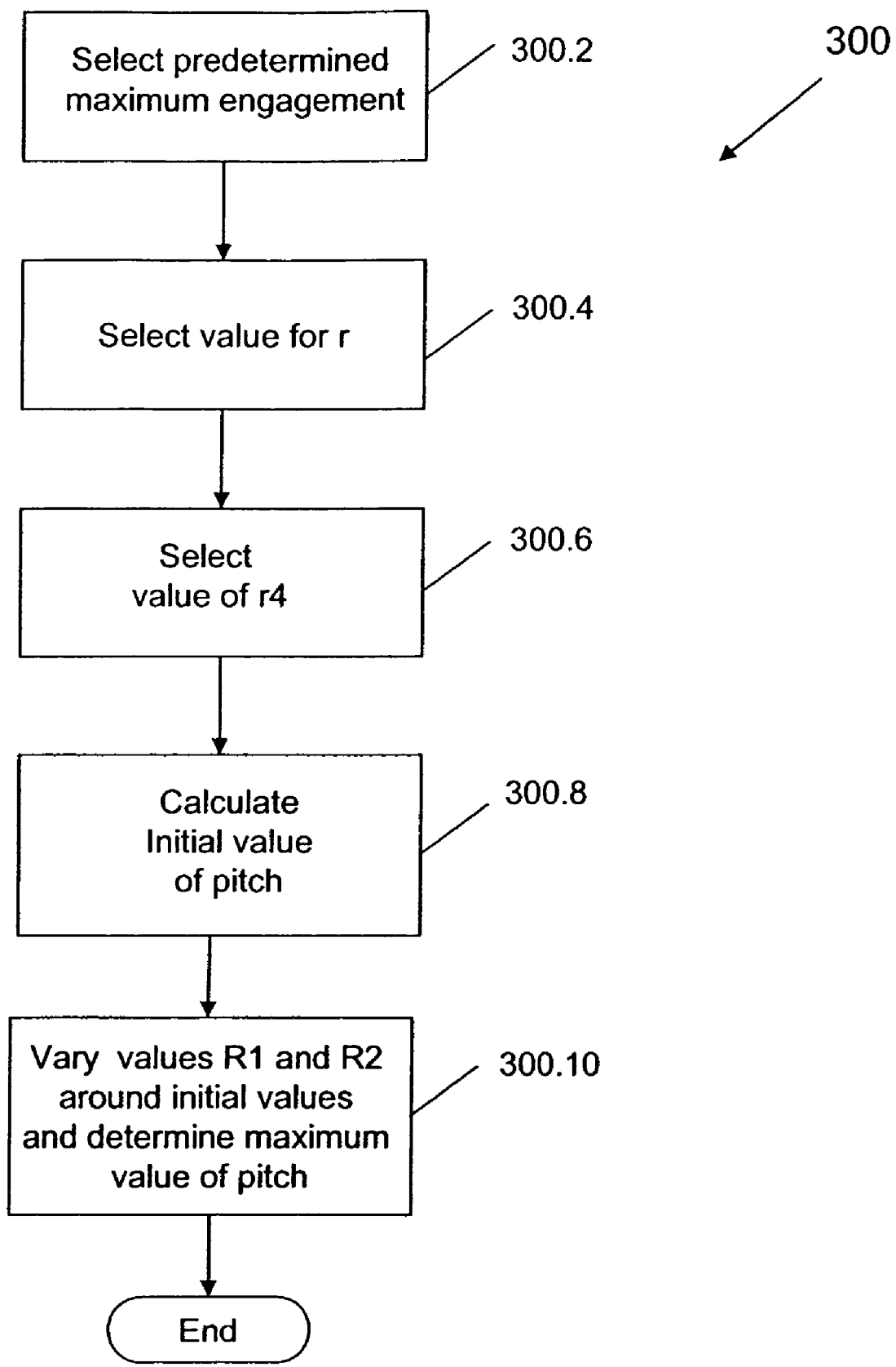
FIG. 36 is a flowchart of a process for determining the maximum value of pitch in accordance with the eighth embodiment.

The value of pitch determined by steps in Table I does necessarily result in the largest possible value of pitch for which the maximum engagement is substantially equal to the desired maximum engagement. FIG. 36 is a flowchart which describes an iterative process 300 which maximizes the pitch for given values of engagement and milling cutter radius. In step 300.2, the desired maximum engagement E of the milling cutter is selected. At step 300.4, the radius r of the milling cutter is selected. At step 300.6 an initial value of the minimum radius of the tool path is selected for the purpose of varying the values of R1 and R2. At step 300.8, a calculation is made, using the steps of Table I, of an initial value of pitch for achieving the desired maximum engagement. At step 300.10, the maximum value of pitch which results in the maximum engagement being substantially equal to the desired maximum engagement is determined by adopting trial values for r4 around the initial value of r4, computing the pitch for each of the trial values of r4 using the steps of Table I and, by using any one of known techniques, estimating the maximum value of the pitch from the values of pitch calculated from the trial values of r4. It should be understood that the program of Table I is not the only way for determining the pitch. Other methods including graphical construction methods are also suitable.

The eighth embodiment is not limited to generating a tool path for machining a slot. In general, the method of the eighth embodiment is applicable to any region having first, second and third sides, where the first side is a current in-process material boundary, the second and third sides are part or material boundaries and the first side meets at its respective ends, the second and the third sides. For example, the method of the eighth embodiment can be applied to machining converging, parallel, and diverging configurations of material boundaries including an "hour glass" shape similar to FIG. 13.

Figure 37:
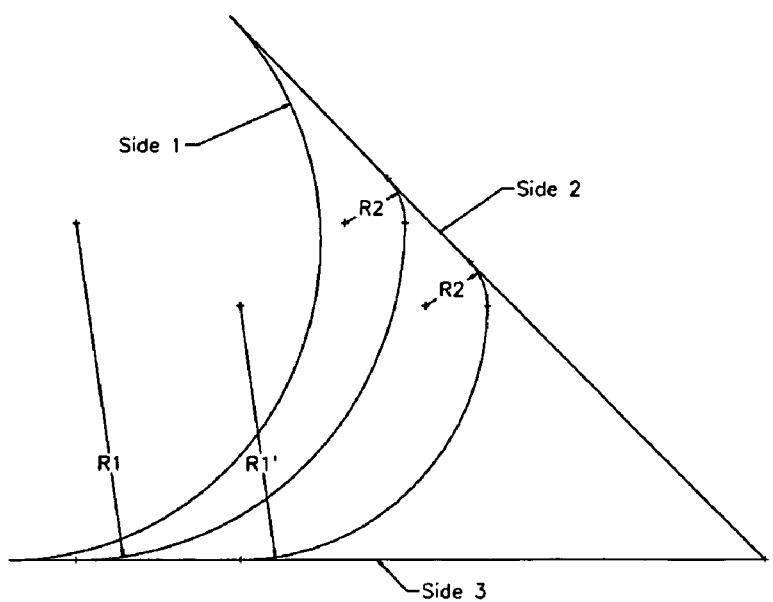
FIG. 37 illustrates the in-process material boundaries formed in an acute corner in accordance with the eighth embodiment.

An example of determining the parameters of a tool path for machining a corner in accordance with the eighth embodiment is shown in FIG. 37, where the line identified as side 1 is the current in-process material boundary and sides 2 and 3 correspond to part boundaries. According, to process 300, values for the tool radius, and the radii of the first and second arcs, R1 and R2 and the pitch, are selected for achieving a desired maximum engagement using the principles described above and using as the width, the distance between the two sides at the intersection of the in-process material boundary and the sides. A center for the second arc (smaller arc) is selected within the region to be milled which results in the second arc being tangent to the side 2. A center for the first arc is then determined such that the first arc is tangent to the side 1 and tangent continuous with the second arc. The process of advancing each pass (radii R1' and R2') is then continued, taking into account the varying width of the region.

Ninth Preferred Embodiment

When milling a pocket using an inside-out tool path, it frequently occurs that the milling cutter traverses corners in which the engagement of the milling cutter increases as compared to the engagement of the milling cutter when traversing portions of the tool path adjacent to the corners. Such increases in the milling cutter engagement require downward adjustment of the feed rate in order to avoid excessive milling cutter wear and other problems, as discussed previously. In the ninth embodiment, the tool path is modified to introduce preparation cuts prior to machining each corner in the tool path. Consequently a predetermined engagement is not exceeded when machining a prepared corner.

Figure 38:
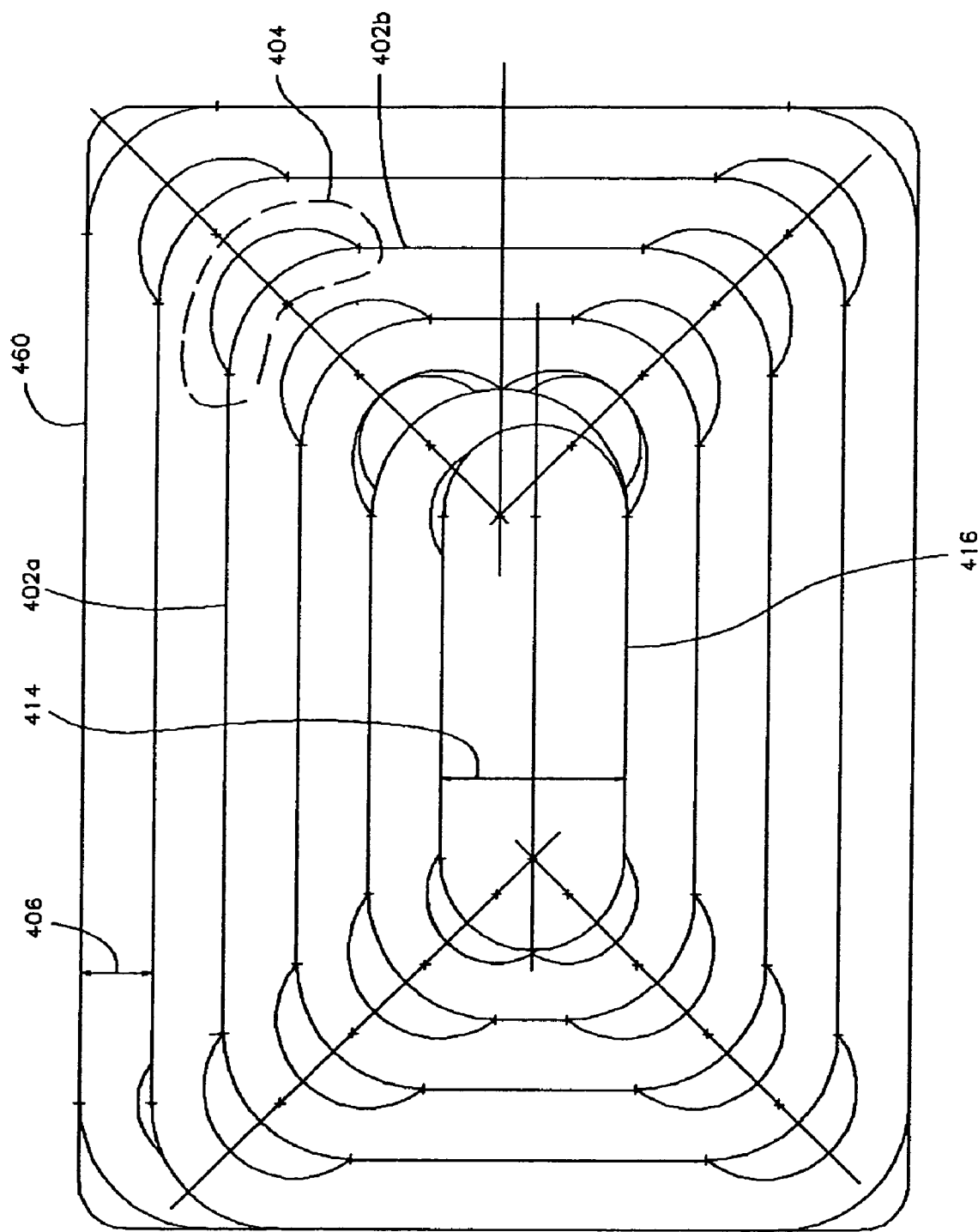
FIG. 38 illustrates an in-process material boundary corresponding to the tool path generated in accordance with the ninth embodiment.

Referring now to FIG. 38, there is shown an in-process material boundary corresponding to an inside-out tool path for machining a pocket in accordance with the ninth embodiment. In the ninth preferred embodiment, the tool path comprises a plurality of first portions 402*a*, a plurality of second portions 402*b* and a plurality of transition portions 404 connecting together the plurality of first portions 402*a* and the plurality of second portions 402*b*. While the first and second portions 402*a*, 402*b* are shown to be straight lines in FIG. 38, the first and second portions 402*a* and 402*b* need not be straight lines but may be arcuate. However, in practicing the ninth embodiment, the transition portions 404 generally have a greater curvature than the first and second portions 402*a*, 402*b*.

Generally, the plurality of first portions 402*a* are parallel to each other and the plurality of second portions 402*b* are parallel to each other. The plurality of first portions 402*a* and the plurality of second portions 402*b* are separated by a common value of stepover 406. While FIG. 38 shows a rectangular pocket in which the in-process material boundary is spiral-like extending from a slot shaped starting hole 416 to a part boundary, one skilled in the art would understand that the ninth embodiment is not limited to a rectangular part boundary with a slot shaped starting hole and having a tool path with straight lines and that both the part boundary, the starting hole and the tool path could be completely arbitrary in shape and still be within the spirit and scope of the invention.

Preferably, the stepover 406 between the first portions 402*a* and the second portions 402*b* is determined based on a predetermined maximum engagement of the milling cutter when machining the first and the second portions 402*a*, 402*b*. Preferably, the stepover 406 results in the portion of the in-process material boundary adjacent to the part boundary of the pocket being coincident with the part boundary. Where the stepover 406 results in non-coincidence of the in-process material boundary with the part boundary, a process similar to process 200, shown in FIG. 5, may be used to adjust the value of the stepover 406 to make the portion of the in-process material boundary coincident with the part boundary. Alternative to determining the value of the stepover 406 based on a predetermined maximum engagement, the stepover 406 may be selected based on, for example, experiment or experience, and the maximum engagement determined from the selected value of stepover 406 using equation 2.

Figure 39:
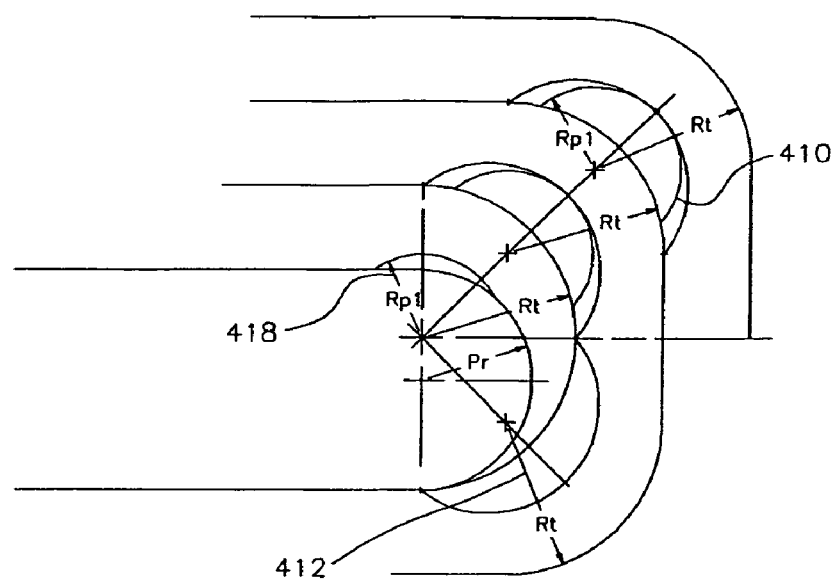
FIG. 39 shows in-process material boundary corresponding to the transition portions of the in-process material boundary shown in FIG. 38.

Referring now to FIG. 39, there is shown a detail of the in-process material boundaries formed by the transition portions 404 of the tool path. Initially, the parameters for each transition portion 404 are found by: (1) determining a radius 412 of a first arc 408 based on the stepover 406 and a width 414 of the starting hole 416, and (2) determining a radius 418 of a second arc 410 for each of the transition portions 404 based on the radius 412 of the first arc 408 and the maximum engagement of the milling cutter.

Preferably, the radius, (Rt), 412 of the first arc 408, equals the sum divided by two of the width 414 of the starting hole 416 and the stepover 406, and the radius 418, (Rpl) of the second arc 410 equals $\mathrm{sqrt}\ (r^2+(Rt-r)^2-2*r*(Rt-r)*\mathrm{Cos}$ (180-E)), where E is the maximum engagement angle and r is the radius of the milling cutter.

Figure 40:
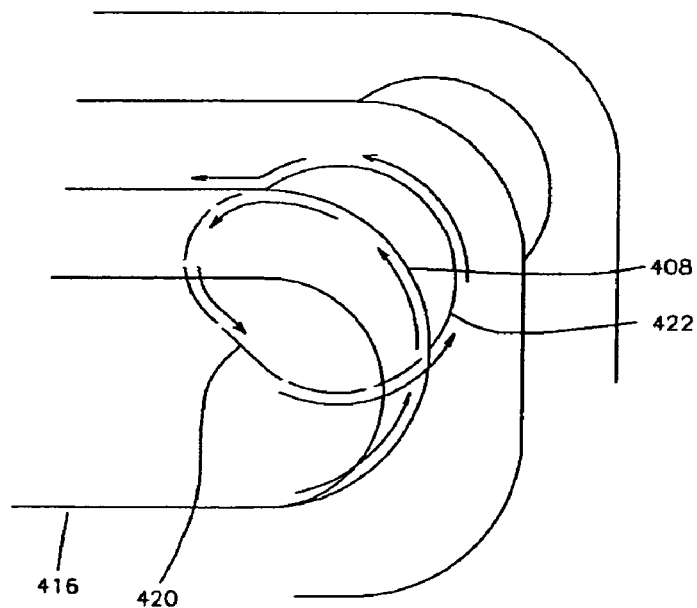
FIG. 40 shows the path taken by a milling cutter when milling the in-process material boundary corresponding to the transition portion of the tool path shown in FIG. 38.

FIG. 40 shows the development of the in-process material boundary for the transition portion 404 of the tool path. Preferably, the tool path for each transition portion 404 is determined by situating the first arc 408 so as to connect the first portion 402a and the second portion 402b in a tangent continuous manner; situating a third arc 420 so as to be tangent continuous with a first end 408a of the first arc 408 at a first end 420a and intersecting a second end 408b of the first arc at a second end 420b; and situating a fourth arc 422 so as to be: (1) tangent continuous with the second end 420b of the third arc 420, (2) tangent to the second arc 408 and (3) tangent continuous with at least one of the first portion 402a and the second portion 402b.

Preferably, the tool path for each transition portion 404 is generated by sequentially computing the parameters of the first arc 408, the third arc 420 and the fourth arc 422 for each transition portion in turn as the tool path for the pocket is developed. However, it is not necessary to compute the parameters in that order. For instance, the parameters of the first arc 408 could be computed as an initial spiral-like tool path for the pocket is computed and the parameters for the third and the forth arcs computed after the initial tool path is computed to arrive at the final tool path. Further, one skilled in the art would recognize that the insertion of a transition portion 404 into a tool path is not limited to a spiral-like tool path. A transition portion 404 could be inserted into a portion of any shape of parallel offset tool path where it would be desirable to reduce the engagement of the milling cutter in that portion.

Tenth Preferred Embodiment

Figure 41:
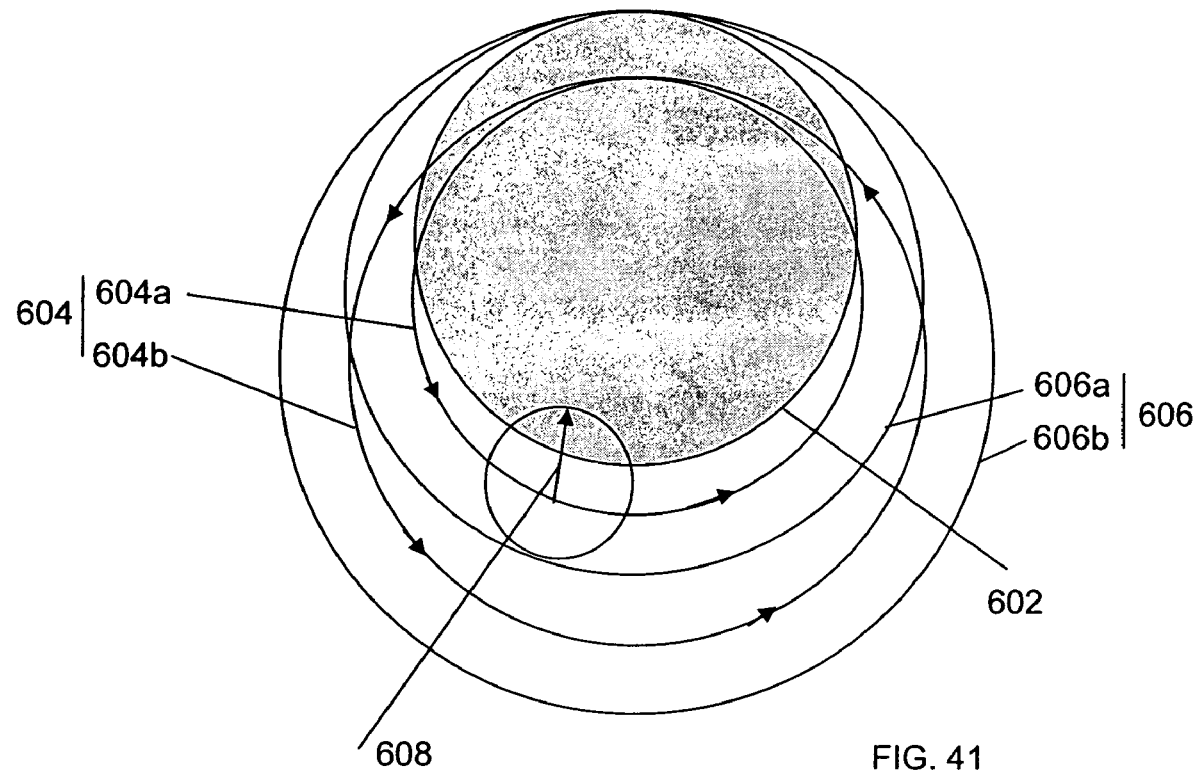
FIG. 41 shows a tool path for enlarging a region in accordance with the tenth embodiment.

Referring now to FIG. 41 there is illustrated a tool path for enlarging a region bounded by a first material boundary 602. Also shown is a tool path 604 consisting of one or more 360 degree circular passes of increasing radius arranged end to end. A first pass 604a and a second pass 604b are shown. FIG. 41 also shows a second material boundary 606a created by the first pass 604a and a third material boundary 606b created by the second pass 604b at an offset equal to the radius 608 of a milling cutter. Each of the one or more passes 604 are tangent at a common point and each material boundary 606 created by the one or more passes 604 are tangent at a common point.

If a radius of each one of the one or more circular passes is properly selected, the first material boundary 602 may be enlarged by a tool path 604 consisting of the one or more circular passes such that an engagement of the milling cutter, when following the tool path 604, will not exceed a predetermined engagement.

Figure 42:
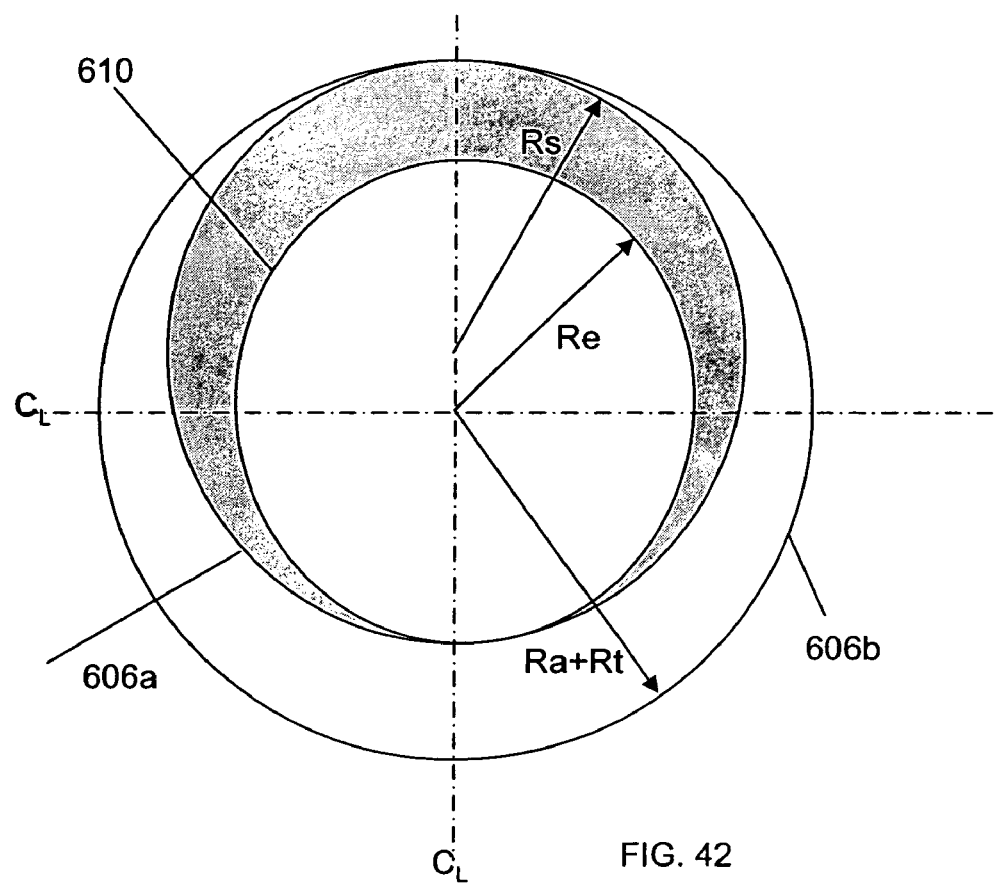
FIG. 42 shows a geometric construction for determining a radius for each pass of the tool path of the tenth embodiment.

Referring to FIG. 42, an engagement circle 610 having a radius Re can be defined as a circle traced by the end point of a leading side of a predetermined tool engagement angle as a milling cutter of radius Rt, 608 traverses a circular pass (not shown) of radius Ra for creating an enlarged material boundary 606b having a radius of Ra+Rt. For a given value of Ra, a given value of the tool engagement angle E, and a given value of the radius Rt, 608, the value of Re of the corresponding engagement circle 610 can be calculated using basic trigonometric formulas as:

$$Re = \sqrt{Ra^2 + Rt^2 + 2RaRt\cos E} \quad (20)$$

Characteristically, the engagement of a milling cutter following a pass 604 gradually increases toward a maximum value and then decreases. If the engagement circle 610 intersects a previous material boundary at a single point, such as shown by 606a in FIG. 42, the engagement of the milling cutter when following the tool path gradually increases to the predetermined value of engagement and then gradually decreases. This condition satisfies the following equation:

$$Re = 2Rs - (Ra + Rt), \quad (21)$$

where Rs is the radius of the previous material boundary 606a and Ra+Rt is the radius of the enlarged material boundary 606b.

A value for the radius of the tool path for milling an enlarged material boundary 606b, where the maximum engagement of the milling cutter equals the predetermined maximum engagement, is found by substituting equation 21 into equation 20 resulting in:

$$Rao = 2Rs\left(\frac{Rs - Rt}{2Rs - Rt + Rt\cos E}\right) \quad (22)$$

If Ra<Rao, the engagement circle does not intersect the previous material boundary and the engagement will be less than the predetermined maximum engagement. If Ra>Rao, the engagement circle 610 intersects the previous material boundary 606a at two points. In this case the maximum engagement of the milling cutter will exceed the predetermined maximum engagement over a range of points along the enlarged material boundary 606b. Insertion of a transition portion in the previous material boundary according to the ninth preferred embodiment may be used to mitigate the excess engagement.

It would be clear to one skilled in the art that equation 22 can be used as a basis for increasing the size of a material boundary without limit, all the while maintaining the engagement of the milling cutter to be less than a predetermined value, by simply constructing a succession of increasing radius passes and substituting the value of the radius of the previous pass Ra for the value of Rs. Further, the method is not limited to the circular pocket shown in FIG. 41. The method may also be used to increase the size of a circular arc, such as might be desired to be milled in a part boundary. Also, the method may be used to enlarge any shape, provided the starting boundary is substantially circular.

It may be seen that the present invention describes a method for directly generating a tool path which is based on controlling the engagement of the milling tool with the workpiece. Each tool path encompasses a substantial portion of a defined region. The disclosed embodiments of the invention are adapted to generating tool paths for regions of differing geometry, but all have the common characteristic that maintaining the relative constancy of the engagement of the milling cutter is decisive in determining the tool path. The result of preferentially controlling the engagement of the milling cutter is a CNC program which removes material in a shorter time than CNC programs generated by existing CAM programs while providing improved tool life.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method implemented in a computer for generating a tool path for milling a region of a workpiece by a numerical control machine using a milling cutter, the tool path comprising one or more passes, each pass forming an in-process material boundary comprising a plurality of tangential continuous arcs, each pass successively advancing into the region by a predetermined pitch, the region having first, second and third sides, the first side being a current in-process material boundary and the second and the third sides being part or material boundaries, the first side meeting at its respective ends the second and the third sides, the method for determining parameters of each one of the one or more passes comprising the steps of:

receiving parameters describing the region;

determining the parameters of a first one of the plurality of tangential continuous arcs to be tangent to the second side and having a radius of curvature greater than one-half of a distance between the second and third sides at the points where the first side meets the second and the third sides; and determining the parameters of a second one of the plurality of tangential continuous arcs, said second one of a plurality of tangential continuous arcs being joined at one end to one end of the first one of the plurality of tangential continuous arcs and to be tangent to the third side, and having a radius of curvature less than one-half the distance between the second and the third sides at the points where the first side meets the second and the third sides, and outputting a series of instructions useful for controlling the numerical control milling machine to mill the region in accordance with the generated tool path.

2. The method of claim 1, wherein the region is a slot.

3. The method of claim 1 wherein each in-process material boundary consists of two arcs.

4. The method of claim 3, wherein each of the arcs is circular.

5. The method of claim 1, wherein the pitch is determined such that a maximum value of engagement of the milling cutter when milling each one of the in-process material boundaries is substantially equal to a predetermined maximum value of engagement.

6. The method of claim 5, further including the step of adjusting the radius of each first tangential arc and each second tangential arc such that the pitch is maximized.

7. The method of claim 5, wherein the wherein the pitch is based on a distance between the second side and the third side and the radius of the milling cutter.

8. The method of claim 1, wherein a radius of the milling cutter is selected such that a width of the first side is from 2.2 to 5 times the radius of the milling cutter.

9. An article of manufacture comprising a computer readable medium having stored thereon computer executable instructions for generating a tool path for milling a region of a workpiece by a numerical control machine using a milling cutter, the tool path comprising one or more passes, each pass forming an in-process material boundary comprising a plurality of tangential continuous arcs, each pass successively advancing into the region by a predetermined pitch, the region having first, second and third sides, the first side being a current in-process material boundary and the second and the third sides being part or material boundaries, the first side meeting at its respective ends the second and the third sides, the method for determining parameters of each one of the one or more passes comprising the steps of:

receiving parameters describing the region;

determining the parameters of a first one of the plurality of tangential continuous arcs to be tangent to the second side and having a radius of curvature greater than one-half of a distance between the second and third sides at the points the first side meets the second and the third sides; and determining the parameters of a second one of the plurality of tangential continuous arcs, said second one of a plurality of tangential continuous arcs being joined at one end to one end of the first one of the plurality of tangential continuous arcs and to be tangent to the third side, and having a radius of curvature less than one-half the distance between the second and third sides at the points where the first side meets the second and the third sides, and outputting a series of instructions useful for controlling the numerical control machine to mill the region in accordance with the generated tool path.

10. The article of manufacture of claim 9, wherein the region is a slot.

11. The article of manufacture of claim 9, wherein each in-process material boundary consists of two arcs.

12. The article of manufacture of claim 11, wherein each of the arcs is circular.

13. The article of manufacture of claim 9, wherein the pitch is determined such that a maximum value of engagement of the milling cutter when milling each one of the in-process material boundaries is substantially equal to a predetermined maximum value of engagement.

14. The article of manufacture of claim 13, further including the step of adjusting the radius of each first tangential arc and each second tangential arc such that the pitch is maximized.

15. The article of manufacture of claim 13, wherein the wherein the pitch is based on a distance between the second side and the third side and the radius of the milling cutter.

16. The article of manufacture of claim 9, wherein a radius of the milling cutter is selected such that a width of the first side is from 2.2 to 5 times the radius of the milling cutter.

* * * * *